US007251570B2

(12) United States Patent
Hancock et al.

(10) Patent No.: US 7,251,570 B2
(45) Date of Patent: Jul. 31, 2007

(54) DATA INTEGRITY IN A MESH NETWORK

(75) Inventors: Martin A. Hancock, Victoria (CA); Arthur B. Wynans, Victoria (CA); Bernard C. Mansey, Malahat (CA); Darrin G. Marr, Victoria (CA); Simon H. Lightbody, Victoria (CA); Michael E. Teachman, Victoria (CA); Scott M. Henneberry, Franklin, TN (US)

(73) Assignee: Power Measurement Ltd., Saanichton (CA)

(*) Notice: Subject to any disclaimer, the term of this patent is extended or adjusted under 35 U.S.C. 154(b) by 10 days.

(21) Appl. No.: 11/122,380

(22) Filed: May 4, 2005

(65) Prior Publication Data

US 2006/0056370 A1    Mar. 16, 2006

Related U.S. Application Data

(63) Continuation-in-part of application No. 11/083,909, filed on Mar. 18, 2005, and a continuation-in-part of application No. 10/892,837, filed on Jul. 16, 2004, now Pat. No. 7,089,089.

(60) Provisional application No. 60/488,700, filed on Jul. 18, 2003, provisional application No. 60/554,188, filed on Mar. 18, 2004.

(51) Int. Cl.
*G01R 15/00* (2006.01)
*G06F 19/00* (2006.01)

(52) U.S. Cl. .................................. 702/57; 709/224

(58) Field of Classification Search ............ 702/44–45, 702/57, 60–63; 700/286, 291; 709/223–227, 709/230, 238
See application file for complete search history.

(56) References Cited

U.S. PATENT DOCUMENTS 3,534,247 A    10/1970    Miljanic ..................... 323/357

| 4,841,236 A | | 6/1989 | Miljanic et al. ............ 324/127 |
|---|---|---|---|
| 5,710,723 A | * | 1/1998 | Hoth et al. ................. 702/181 |
| 5,854,994 A | * | 12/1998 | Canada et al. ................ 702/56 |
| 5,874,903 A | | 2/1999 | Shuey et al. ........... 340/870.02 |
| 6,018,700 A | | 1/2000 | Edel ............................ 702/60 |
| 6,052,364 A | * | 4/2000 | Chalmers et al. ........... 370/312 |
| 6,115,653 A | * | 9/2000 | Bergstrom et al. ............ 701/29 |

(Continued)

FOREIGN PATENT DOCUMENTS

WO    WO 02/039242    5/2002

(Continued)

*Primary Examiner*—Marc S. Hoff
*Assistant Examiner*—Mary Catherine Baran
(74) *Attorney, Agent, or Firm*—Workman Nydegger

(57) ABSTRACT

Systems and methods for ensuring data integrity in a mesh network. A mesh network can include multiple RF devices. Transmitting quality data in or on the mesh network is improved using communication validation functions. The communication validation functions ensure a reliable communication network, preserve data during a network outage, and validate data. The communication validation functions can measure or control data quality within a communication and analysis network. The communication validation function operates to control data quality, for example, by measuring the quality of wireless links, ensuring the presence of redundant links, testing the ability of the mesh network to establish a backup communication path, generating alarms based on communication thresholds, tracking the communication path followed by communication packets, and identifying placement locations for additional RF devices.

49 Claims, 9 Drawing Sheets

U.S. PATENT DOCUMENTS

| | | | |
|---|---|---|---|
| 6,172,616 B1 | 1/2001 | Johnson et al. | 340/870.12 |
| 6,373,399 B1 | 4/2002 | Johnson et al. | 340/870.11 |
| 6,437,692 B1 | 8/2002 | Petite et al. | 340/540 |
| 6,653,945 B2 | 11/2003 | Johnson et al. | 340/870.02 |
| 6,804,790 B2 | 10/2004 | Rhee et al. | 713/320 |
| 7,000,021 B1 * | 2/2006 | Radhakrishnan et al. | 709/230 |
| 7,079,551 B2 * | 7/2006 | Shivnan | 370/469 |
| 7,089,089 B2 * | 8/2006 | Cumming et al. | 700/295 |
| 2002/0019725 A1 | 2/2002 | Petite | 702/188 |
| 2003/0001754 A1 | 1/2003 | Johnson et al. | 340/870.02 |
| 2003/0099221 A1 | 5/2003 | Rhee | 370/338 |
| 2003/0174067 A1 | 9/2003 | Soliman | 340/870.02 |
| 2005/0132080 A1 | 6/2005 | Rhee et al. | 709/230 |

FOREIGN PATENT DOCUMENTS

| | | |
|---|---|---|
| WO | WO 02/075565 | 9/2002 |
| WO | WO 03/047175 | 6/2003 |

* cited by examiner

DATA INTEGRITY IN A MESH NETWORK

CROSS-REFERENCE TO RELATED APPLICATIONS

This application is a continuation-in-part of U.S. application Ser. No. 11/083,909, filed Mar. 18, 2005 and entitled "Solar Powered Radio Frequency Device Within an Energy Sensor System", which claims the benefit of U.S. Provisional Application No. 60/554,188, filed Mar. 18, 2004 and entitled "A Non-Intrusive Energy Sensor with Wireless Communications". This application is also a continuation-in-part of U.S. patent application Ser. No. 10/892,837, now U.S. Pat. No. 7,089,089 entitled "Methods and Apparatus for Retrieving Energy Readings from an Energy Monitoring Device" and filed Jul. 16, 2004, which claims the benefit of U.S. Provisional Application No. 60/488,700 filed Jul. 18, 2003 and entitled "A Wireless Communication Network and RF Devices for Non-Intrusive Energy Monitoring and Control." This application is also related to U.S. patent application Ser. No. 11/122,411 entitled "Grouping Mesh Clusters" and filed the same day as the present application. The foregoing applications are incorporated by reference in their entirety.

BACKGROUND OF THE INVENTION

The Field of the Invention

In facilities, e.g. buildings or installations, where a significant amount of power is used among a variety of units, it would be desirable to allow the building owner to allocate energy costs to the different units, i.e. consumers, within the facility. For a commercial office building, these units may include the different tenants within the building or the common loads for the facility, such as the elevators or HVAC systems. For an industrial facility, these units may include the different production lines, machines or processes within the facility. As opposed to allocating costs based on a fixed or formulaic approach (such as pro-rata, e.g. dollars per square foot or based on the theoretical consumption of a process/machine), an allocation based on actual measurements using appropriate monitoring devices may result in more accurate and useful information as well as a more equitable cost distribution.

Both installation and ongoing, i.e. operational and maintenance, costs for these monitoring devices are important considerations in deciding whether a monitoring system is worth the investment. While monitoring devices may be read manually, which does not increase the installation cost, manual data collection may increase on-going/operational costs. Alternatively, monitoring devices may be interconnected and be automatically read via a communications link. However, typical communication links require wiring to interconnect the devices which increases the installation cost. In addition, a particular tenant in the building may wish to verify that they are being billed correctly by reading the energy meter or other energy monitoring device that is accumulating their energy usage. This may be a straightforward, although labor intensive and cumbersome, process with a typical energy meter which provides a display viewable by the tenant.

Emerging wireless mesh (or ad-hoc) networking technologies can be used to reduce the installation costs of monitoring devices while providing for automated data collection. Also called mesh topology or a mesh network, mesh is a network topology in which devices are connected with many redundant interconnections between network nodes. Effectively, each network node acts as a repeater/router with respect to received communications where the device is not the intended recipient in order to facilitate communications between devices across the network. Using wireless interconnections permits simpler and cost-effective implementation of mesh topologies wherein each device is a node and wirelessly interconnects with at least some of the other devices within its proximity using RF based links. Mesh networking technologies generally fall into two categories: high-speed, high bandwidth; and low speed, low bandwidth, low power. The first category of devices is typically more complex and costly than the second. Since energy monitoring does not typically require high speed/high bandwidth communication, the second category of devices is often sufficient in terms of data throughput.

Energy monitoring devices may include electrical energy meters that measure at least one of kWh, kVAh, kVARh, kW demand, kVA demand, kVAR demand, voltage, current, etc. Energy monitoring devices may also include devices that measure the consumption of water, air, gas and/or steam.

Poor data integrity may manifest itself as poor data quality. Poor data quality may restrict the ability to execute business plans and may cost organizations money. Poor data quality may manifest itself in a failure of analytics and a failure in business initiatives. Analytic systems that do not implement at least some data quality mechanisms may suffer from limited acceptance or failure due to the lack attention to data quality issues. A Global Data Management Survey by Pricewaterhousecoopers in 2001 recorded the 75% of enterprises reported significant problems as a result of data quality issues. More than 50% had incurred extra costs due to the need for internal reconciliation, 33% had been forced to delay or scrap new systems, 33% had failed to bill or collect receivables. 20% had failed to meet a contractual or service level agreement. As analytical systems begin to be used on energy measurements, there is a significant need to ensure that there are data quality mechanisms to increase the level of data quality within an energy analytic system. In addition, there is a significant need to report the level of data quality within the energy analytic system.

Companies' reliance on data may be increasing sharply and irreversibly in the future as more 'automated' decisions may be based on data. This increases companies' exposure to bad data and raises a need for data integrity to be addressed in an energy analytic system. An analytic system that relies on historical data stores and real time data to present data, analysis, or report and perhaps automatic decisions may have a significantly reduced value if a data integrity quality system and analysis is not addressed within the analytic system. There is an increasing need to have data integrity issues addressed within an energy analytic system especially within a wireless mesh communication system.

BRIEF SUMMARY OF THE INVENTION

These and other limitations are overcome by embodiments of the invention, which relate to systems and methods for controlling or measuring data integrity in a mesh network. In one embodiment, a system for monitoring energy data that is representative of the energy from at least a point of an energy distribution system includes a wireless mesh network. A first radio frequency ("RF") device operates to monitor energy at least at one point of the energy distribution system, construct energy data representative of at least a portion of the monitored energy, construct a communication packet containing the energy data, and transmit the communication packet on the wireless mesh network. A second RF device is coupled to the first RF device with a wireless link. The second RF device operates to receive the communication packet from the wireless mesh network and retransmit the communication packet over the wireless mesh network. The wireless link between the first RF device and the second RF device includes a data link. A data integrity function couples with at least one of the first and second RF devices, and operates to monitor data integrity of the energy data. The data integrity of the energy logs and communication system may be verified by using validation rules, estimation rules, editing rules and a data validation engine. The reporting of the data integrity may be facilitated by using a number of nines representation, alarm indications, signal to noise ratios and graphical depiction of the communication network with reliability indications. The data integrity of the logs within remote device may be preserved using a lossy style of compression, removing interval data and storing the data within remote devices accessible by a data link. The communication packet typically contains a value representative of at least a portion of the energy data.

In another embodiment, a system for controlling data quality within an energy distribution system includes a mesh network having a first RF device and a second RF device. The first RF device and the second RF device are able to communicate over a plurality of wireless links. The system also includes a communication validation function coupled to the first RF device and the second RF device. The communication validation function operates to monitor the plurality of wireless links in order to facilitate the transmission of energy data on the mesh network by adjusting at least one of the first RF device, the second RF device, and the plurality of wireless links.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Herein, the phrase "coupled with" is defined to mean directly connected to or indirectly connected through one or more intermediate components. Such intermediate components may include hardware, communication and software-based components. Additional intermediate components may include electrical field coupled and magnetic field coupled components. The figures included in this document refer to various groups of items using a number prefix and a letter as a suffix, such as 120*a*, 120*b*, and 120*c*. The number listed alone without the letter suffix refers to at least one of these items. An example of this is when a group of items such as the energy sensors 120 are referred to as energy sensors 120, this is meant to refer at least one of the energy sensors 120*a*, 120*b*, 120*c*, 120*d*, 120*e*, 120*f*, 120*g*, 120*h*, or 120*i*.

The integrity of data on an energy management system is important to the overall analysis and billing potential of the energy management system. Bad data integrity can lead to data quality issues. Data quality issues within an energy management system may cause incorrect billing, maintenance problems, distribution issues and electrical failure. There are at least three areas for improvement that a data integrity function can assist with data quality issues within an energy management system. These three areas include ensuring a reliable communication network, preserving data during a network outage, and validating data. A data integrity function is a measure or control of data quality within a communication and analysis network. A data integrity function may include a system that may ensure a reliable communication network, a system that may preserve data during a communication network breakdown, or a system for validating, estimating, and editing data measured or received by a device or system.

Two of the benefits of data integrity system, ensuring reliable communication network and preserving data during a network outage, may be particularly of interest with a wireless network such as a wireless mesh network; however methods covering all three data integrity methods are disclosed within this document.

The present embodiments reduce the costs of energy metering by reducing the installation costs and commissioning costs for metering points. In addition, the present embodiments reduce the need for additional external components such as potential transformers, current transformers, and measurement cabinets. The present embodiments are able to reduce these costs by using various combinations of the following technology discussed below. By reducing these costs, the number of metering points within an energy distribution system, such as an electrical energy distribution system, may be increased; similar approaches may be used to increase the number of metering points throughout other energy distribution systems such as water, air, gas and steam distribution systems.

Figure 1:
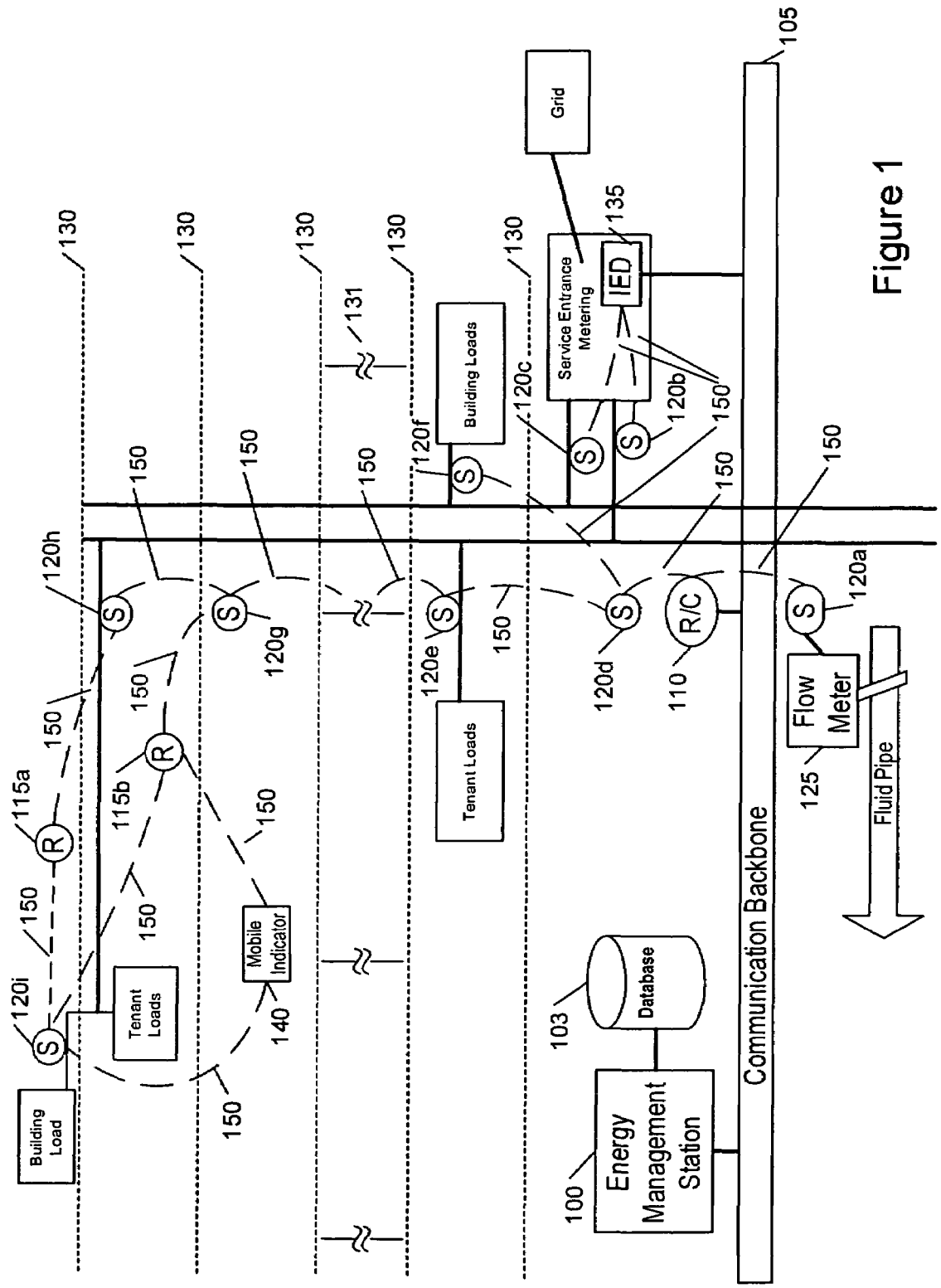
FIG. 1 depicts a system of energy sensors within a commercial building communicating over a wireless mesh network.

Referring now to FIG. 1, a wireless network composed of a radio frequency ("RF") repeater converter 110, RF repeater 115, and energy sensors 120 are used to transmit communication data packets between the energy management station 100 and the energy sensors 120. As shown in FIG. 1, this wireless network may be deployed within a commercial building space. An RF device includes at least one of RF repeater converter 110, RF repeater 115, energy sensors 120, RF signal strength sensors, or RF display devices 140. The RF devices make use of an RF mesh network for communication. Using RF communications, the present embodiments may be able to reduce the cost of metering an additional point or to reduce the cost of communicating an existing metering point in an energy distribution system back to the energy management station 100 or SCADA software by significantly reducing the cost of making communication wires available at the metering point and maintaining the communication wires between the energy management station 100 and the metering point.

The energy management station 100 may be software residing on a computer or firmware residing on an intelligent electronic device (IED). The energy sensor 120 is an IED that is able to meter at least one energy related parameter and communicate over an RF mesh network. An energy sensor 120 may include various measurement coupling devices. This allows the energy sensor 120 to measure or couple with measurements of various forms of energy. An alternate embodiment of the energy sensor 120 may include a measurement coupling device such as a digital input used for a pulse counter used to read pulses. An example is shown in FIG. 1, where an energy sensor 120a is monitoring pulses from a flow meter 125 over a pulse connection. These pulses may originate from another energy meter that may measure water, air, gas, electrical or steam energy. An alternative embodiment may contain a measurement coupling device that directly couples with the energy being measured.

The energy management station 100 is coupled with a RF repeater converter 110 via the communication backbone 105. The RF repeater converter 110 may allow the energy management station 100 to communicate over the network and receive data from the energy sensors 120 within the wireless network. The energy management station 100 may have a connection to a communication backbone 105, such as an Ethernet Network, LAN or WAN, or to an alternative communication medium and may be able to communicate to the wireless network through a RF repeater converter 110 that is connected to an alternative medium, such as a satellite or telephone connection. The alternative communication medium or communication backbone can be composed of any communication channel such as a phone network, Ethernet, intranet, Internet, satellite, or microwave medium.

In FIG. 1, the wireless communication paths 150 represent some of the possible wireless communication paths possible between the RF devices. The wireless network technology used is an adhoc wireless mesh network technology. An adhoc network may have no infrastructure or may comprise an unplanned infrastructure. The adhoc network allows for a communication network to be setup while careful infrastructure planning in advance is typically required with communication networks such as wired Ethernet networks. A mesh network is a network that may contain multiple paths to communicate information. A mesh network comprises a number of RF devices. Typically each RF device is capable of receiving messages from other RF devices and that RF device retransmitting the message onto the mesh network.

An example of this is shown in FIG. 1, where the energy sensor 120e may transmit a message or communication packet(s) 1000 containing an energy measurement it has taken to the intended recipient the energy management station 100. The initial transmission from sensor 120e may only be received by the RF devices within transmission range of sensor 120e. The communication packet 1000 may contain transmission route information 1020 such as how many hops, or direct device to device communication transfers, between RF devices were required last time a message was sent or received from energy management station 100. If another RF device, such as energy sensor 120g, receives the message from energy sensor 120e, it may be able to compare the number of hops the transmissions usually take to be received by the destination and compare this to the number of hops indicated in the communication packet 1000 and determine if it should retransmit the message based on a reduction in the number of hops required from the transmission. The same evaluation process may be carried out by other communication indicators such as a measure of signal to noise ratio or a measure of success rate. In the above example, energy sensor 120d would determine that it is one hop closer to the energy management station 100 and retransmit the communication packet 1000. The energy sensor 120d may add it's route information such as how many hops between other RF devices where required last time a message was sent or received from energy management station 100 to itself. Further, storing and evaluating the route information allows the RF devices and the mesh network system to monitor and react to the communications efficiency of data communications.

RF devices such as RF repeater converters 110, RF repeaters 115, energy sensors 120, and RF display devices 140 that use the adhoc wireless mesh networking technology may be automatically recognized by the other RF devices within communication range. These additional RF devices can be used to extend the wireless network range, bandwidth, throughput, and robustness. For example, if an energy sensor 120i is installed in an area that is not currently within the range of the mesh network, the installer need only add at least one appropriate RF repeater 115 to extend the range of the mesh network. In another example, the system may be designed with a second RF repeater 115b that overlaps some of the service area of the first RF repeater 115a, in this scenario the energy sensor 120i that is in the overlapped area has at least two different communication paths back to the energy management station 100. This increases the robustness of the system in that if the first RF repeater is damaged or is temporarily blocked due to RF noise, the energy sensor 120 may still be able to communicate via the second RF repeater 115. The mesh network can be made secure such that additional RF devices must be either secured to the network or contain a security key that is accepted by an authentication device within the network. The communication security may comprise a public and private key system where the encrypted or signed data and the public key are transmitted on the RF mesh network.

The RF devices may be able to automatically modify their RF transmission power to only be as strong as required to reach an RF repeater or other RF device in the mesh network with adequate signal to noise ratio (SNR). This adjustment of RF transmission power may be referred to as a RF power control. For example, the microprocessor 825 (see FIG. 7) within the RF device may slowly increase power until at least one RF device closer to the target, for instance the energy management station 100, successfully receives the message. Alternatively, when a communication packet 1000 is received from another RF device, that packet may contain the set transmission power of that RF Transceiver 875. The transmission power information may be used by itself or with another measure such as signal to noise by the microprocessor 825 to determine the required RF transmission power of the RF Transceiver 875.

Another example of microprocessor 825 controlling the RF transmission power of the RF Transceiver 875 may occur if a transmission is sent from the source RF device and is picked up by at least two separate RF devices. The source RF device may receive the communication packet as retransmitted by both RF device and may either modify the next communication packet so that it is not repeated by one of the devices or modify the transmission power of its RF transceiver 875 so that only one RF device is within RF range of the transmission. This has an added benefit of reducing the range of the RF transmission zones to increase security as well as reduce the power requirement of the RF repeater. If the RF device that transmits the communication packet does not receive confirmation of successful transmission or does not see the packet retransmitted from another RF device, the transmitting RF device may increase the transmission power in an attempt to reach another RF device within the mesh wireless network.

The RF device's control over the RF transmission power may be used to create mesh zones. An RF zone may be used if a number of RF devices are within communication range of each other but by limiting their RF transmission power they would limit their range of their RF transmissions to be within a RF zone. At least one of the RF devices participating within this RF zone would act as a repeater or gateway to the rest of the mesh network. The RF device may be able to dynamically modify their RF transmission power depending on the communication packets intended destination or next intended hop to their destination.

As a result of the RF devices ability to modify their transmission range, the network security may be enhanced as RF power is set to a minimum required level. In addition, the RF devices power supply requirements are lowered.

The installation of mesh networks such as the energy sensor 120 or RF repeater 115 can be complicated by intermittent network connections due to marginal transmission and reception of data over the network. During the commissioning of the system, all that may normally be done is to verify that each RF device 120 may ultimately communication with the energy management system 100. This verification simply tells the installer that the system is currently working properly, but it does not tell how much operating margin the radios have. For low cost devices, it is usually not feasible to include measurement of signal strength.

The operating conditions of a mesh network radio can change due to near body effects, temperature, interference, fading and multipaths. If RF device 120 reception is close to the operating limit of the radio, then small changes of the operating conditions can render a RF device 120 non-communicating, potentially resulting in one or more RF devices 120 no longer in communication to the energy management station 100.

This disclosure proposes the use of a RF device 120 with a variable RF power to validate the correct operation of the system at a reduced RF power level. During commissioning the system is switched to lower power mode. The RF device 120 may have either or both a variable RF transmission power and a variable RF reception capability. Once the mesh network has been verified to be fully operational, the system is switched to operating mode. This verification may require the installation of appropriate RF repeater 115 or RF repeater converters 110 to complete the network. During normal operation the mesh network node power may be increased to a higher (normal) power level assuring that the reception and transmission of mesh network data is well above any marginal radio operating parameter. Alternatively, the power level may be allowed to be increased to the higher (normal) power level if the RF device is operable to automatically adjust it's transmission power during normal operation.

The RF repeaters 115 are used to receive and retransmit wireless packets between the energy sensors 120 and the energy management station 100 or between two RF devices. For example, the RF repeater 115 may facilitate communication between energy sensor 120i and energy sensor 120h or RF display device 140. These RF repeaters 115 may be capable of performing routing of the wireless packet. These routing tables may be stored in the RF repeater in non-volatile memory so that after a power outage, network communication can quickly be restored. The RF devices may use a self-healing feature that makes use of a network architecture that can withstand a failure in at least one of its transmission paths such as a mesh or partially mesh network. The self-healing feature may allow an RF device to redirect a communication packet such as to avoid a nonfunctioning RF repeater 115 or RF device. In addition, the RF repeaters 115 may be able to determine if they are the final destination for a communication packet, decode the packet, and further carry out the instruction provided. This instruction can be the modification of a setup within the RF device, request to read a register, part of a firmware upgrade, communication acknowledgment, or an instruction to generate an alternate communication packet. At least a portion of the RF repeater 115 may be implemented within an ASIC chip.

The RF repeater converters 110 or gateway device 110 may be used to repeat the RF signals as necessary in a similar manner as the RF repeaters 115. In some cases, the RF repeater 115 functionality may be left out of the RF repeater converters 110 to reduce cost; however, when the RF repeater converters 110 have this capability there can be an additional cost savings as the network is extended without the requirement of a RF repeater 115. In addition, the RF repeater converters 110 may be operable to provide a bridge between the wireless mesh network and other communication devices such as a Ethernet backbone, power line carrier, phone network, internet, other wireless technologies, microwave, spread spectrum, etc. In addition, the RF repeater converters 110 may be able to determine if they are the final destination for a communication packet, decode the packet, and further carry out the instruction provided. This instruction can be the modification of a setup within the RF device, part of a firmware upgrade, communication acknowledgment, or an instruction to generate an alternate communication packet. At least a portion of the RF repeater converter 110 may be implemented within an ASIC chip.

The energy sensors 120 may be capable of repeating the RF signals in the same way as the RF repeaters 115. In some cases, the RF repeater 115 functionality may be left out of the energy sensor 120 to reduce cost; however, when the energy sensors 120 have this capability there can be an additional cost savings as the network is extended without the requirement of an RF repeater 115. Energy sensors 120 that can act as RF repeaters 115 can increase the range and robustness of the network as well as reduce the number of components required to make up the wireless mesh network. The sensors 120 have the additional task of generating a communication data packet containing a measurement that they have taken or calculated. In addition, the energy sensor 120 may report the status of the energy sensor 120. In addition, the energy sensors 120 may be able to determine if they are the final destination for a communication data packet, decode the packet, and further carry out the instruction provided. This instruction can be the modification of a setup within the energy sensor 120, request to read a register, part of a firmware upgrade, communication acknowledgment, or an instruction to change an output or control a device. An energy sensor 120 is used to monitor or measure at least one energy parameter. This energy parameter may be monitored directly, indirectly or via another monitoring device such as an energy meter with a pulse output or an energy meter with a communication port. Alternately, the energy sensor 120 may monitor a parameter that has an effect on an energy distribution system such as temperature, vibration, noise, breaker closure, etc. At least a portion of the energy sensor 120 may be implemented within an ASIC chip.

The RF devices may include wireless RF display devices 140. These RF display devices 140 may be mobile, mounted or adhered to the outside of a measurement cabinet. The RF display devices 140 may display readings or alarms from one or more energy sensors 120. These energy sensors 120 may be within the measurement cabinet, in the vicinity of the RF display device 140, or accessible via communications over the RF network. The display devices 140 may contain user interfaces such as keypads, stylists or touch screens that allow access to various displays and quantities within the energy sensors. The RF display device 140 may be mobile and used to communicate to more than one energy sensor 120. Alternatively, the RF display device 140 may communicate to the energy management station 100 and display information or alarms from the energy management station 100. In addition, these RF display devices 140 are able to correlate various readings from different energy sensors 120 or specified values, perform calculations and display various parameters or derivations of parameters from the energy sensors 120 they have access to the wireless mesh network. For example, if an IED 135 is able to measure the voltage on the bus or the voltage is a specified constant and the expected power factor is supplied, the RF display device 140 is able to correlate the values and calculate various energy parameters, such as kVA, kVAR and kW with at least usable accuracy, and display them on the screen or log them into memory. A permanently or semi-permanently mounted RF display device 140 may be usable as active RF repeater 115 to boost the RF signals from sensors within a measurement cabinet or within the vicinity of the RF display device 140. At least a portion of the RF display device 140 may be implemented within an ASIC chip.

The energy sensors 120 are able to take a measurement directly and provide the data wirelessly to the energy management station 100 via the RF repeaters 115 and RF repeater converters 110. Alternatively, the energy sensors 120 or other RF devices can be built into the IED 135 directly such as represented with IED 135. In this example, the energy sensor 120b and energy sensor 120c may communicate to the energy management station 100 through a RF gateway integrated into IED 135 which is connected to communication backbone 105. Depending on the integration of the RF device within the IED 135, the RF device may be able perform IED setup, modification to registers, firmware upgrade and control of the IED 135. In an alternate configuration, a RF repeater converter 110 may be connected to a communication port such as a RS232 port on the IED 135. For example, the communication port 870 may be wired directly to a RS 232, RS 485, universal serial bus ("USB") or Ethernet port on the IED 135. The RF device, such as the repeater converter 110, may be operable to receive wireless communication over the mesh network and if that communication is addressed to an IED 135 connected to the RF device, the RF device would provide the information to the IED 135 over the communication port 870. Further, if the IED 135 sent a message or a response to a message received over the RF device, the RF device may be able to transmit the message onto the wireless mesh network. This effectively would enable a legacy IED 135, an IED 135 device without RF wireless communications, to send and receive packets over the wireless mesh network, using the RF device to send and receive communication packets. The RF device acting as this interface may modify the communication packets to change protocol or add routing information. The RF device may act as a data concentrator where the energy data may be manipulated before transmission such as receiving voltage data from one sensor and current data from another sensor and combining such data. More than one legacy device or IED 135 may be connected to the communication port. This may be complete using more than one communication channel for example two RS 232 interfaces or using an interface such as RS 485 that allows more than one device sharing one communication channel. For example, if there were a number of IEDs connected over RS 485, the RF device would be able to coordinate communication to each individual IED on the RS 485 communication line. Alternatively, there may be a more direct coupling between the two communication ports.

Further, the RF repeater converter 110 may be able to draw power from the communication port of the device to power itself and provide full communication to the device over the wireless mesh network. Three examples of the power available from a communication port are power provided by a USB communication port, power over Ethernet, or parasitic power drawn from an RS-232 port. Alternatively, the RF repeater converter 110 can be powered from an external power source or powered by an alternative power source described later on in this document.

An RF device 200 may be powered by an intermittent or non-reliable power supply such as a solar panel. The above power sources may be intermittent or have periods of being unable to produce enough power for the RF device. The present embodiments may make use of a super capacitor to store the power when it is available and allows for short higher power draws for the RF device. For example, an RF repeater 115 can sit in a low power listening mode, when it receives a packet, the power requirement may increase for the device and finally if the RF repeater is required to retransmit the particular packet, the power requirement will increase again to a sufficient level to transmit to the next RF device in the routing path. The super capacitor is able to store excess energy not required in the low power listening mode and provide extra energy as required in the higher power modes such as when the RF device is required to transmit information or when the microprocessor 825 in the RF device needs additional power to perform a quick, more complex calculation. Other energy storage devices 815 such as a rechargeable battery may be able to function similarly to the super capacitor. An alternative embodiment may be the use of a non-rechargeable battery that may be replaceable to supply any additional power requirements not supplied by the alternative power sources discussed in above in this document.

By using the super capacitor or battery to store energy, the RF devices are operable to transmit a message to the Energy Management Station 100 when the RF device's alternative power supply has diminished or has been removed. The RF devices can be setup with a tolerance threshold such that a momentary (user defined) time must elapse when the power supply is able to provide less power than set by an additional threshold or when the power is cut off entirely before the RF device transmits that power has been removed. This requirement of a passing of a user specified amount of time when the power supplied is less than a threshold reduces the network traffic of the mesh network due to a regular periodic outage that only lasts a short time is not reported.

Alternatively, the RF device can be configured to transmit a message saying that power is low within the device. One of the recipients of this type of message may be the energy management station 100. This message may be sent when both the power supply and the reserved power held by the super capacitor or battery is running low and may indicate that either a better alternative power supply may be used or it may be necessary to charge the reserve power.

Both of the above messages, "power supply low or removed" and "power low within device", can contain any child RF nodes that may lose communication to the rest of the RF mesh network due to the loss of the RF device that has an imminent power loss. Alternatively, this information may be determinable by the energy management station 100.

The RF devices may use long life batteries to power the devices for an extended period of time. These batteries can be made of various technologies such as lithium-ion batteries that can last up to 10 years with a low power draw or other technologies that allow the batteries to have a long life. This solution can be used to give the installer one of the easiest RF devices 200 to install. The RF device 200 can simply be outfitted with a strong adhesive or a magnetic mount. For example, to extend the RF mesh network, the installer only has to take an RF repeater that uses a long life battery and simply stick or magnetically mount it in almost any location.

The RF devices, such as the repeater converters 110 or the repeaters 115, can be built to fit general form factors, and able to draw power off of these standard form factors. For example, an RF device may be made to have a form factor with an interface to a general purpose outlet. This allows the RF mesh network to be extended to any location the repeater can be plugged into a general purpose outlet. Typically this form factor may have a general purpose outlet interface to allow another plug to be plugged into it. For example, if the general purpose outlet (GPO) was already being used, the RF repeater may fit between the GPO and the existing plug. Another similar example is building a repeater 115 into a form factor that may allow it to screw into a standard Edison light socket and allow the light bulb to screw into the repeater form factor. These implementations may use the appliance or light bulb as an RF antenna. Even though the Edison light socket may not always be powered on, when it is powered on the repeater may store energy in a super cap or rechargeable battery.

The RF devices may have a configurable setting that can indirectly determine what average power is required for the device to perform. For example on the energy sensors 120, the user is able to modify sleep, transmit, and sample intervals. For instance, if the sample interval is increased from say a sample every 30 seconds to a sample every 1 minute, the energy sensor 120 is only required to take one reading each minute instead of two readings per minute which may reduce the power required to run the energy sensor 120. This reduction in power may increase the battery life of an energy sensor 120 that relies on battery power. In addition, it may increase the ride through time of the energy sensor 120 if power supplied to the device were insufficient or removed. Further by modifying the transmit interval on an energy sensor 120, the data the energy sensor 120 collected may be stored in the energy sensor 120 and only sent at a specific interval in order to send more data in each communication data packet but be able to transmit the data less often. For example, an energy sensor 120 that samples each minute may only transmit each hour thus significantly reducing the overall power required within an hour to transmit versus an energy sensor 120 that transmits sixty times in an hour. Likewise, a repeater 115 or repeater converter 110 may queue received communication data packets until a specified time interval or timeout has expired when all the data may be transmitted in one transmission. In addition, the RF devices may queue data until sufficient power is stored to allow transmission of the data and continued operation. The data queued within a RF device may be stored within non-volatile memory such that it is not lost due to a power failure. Alternatively, the data may be transferred into non-volatile memory before a power failure on the RF device.

An external power supply can be used to supply extra power allowing the RF device to charge the super cap or rechargeable battery. Typically this may be used either just before installation of the RF device or during commissioning to provide the extra power required to perform setup commands or to handle extra RF communication to set up the device. Alternatively, the external power supply may be used to charge the super capacitor during a period when the device has low power or when the device has indicated that it has low power. This external power supply is a device that is able to generate an electromagnetic field that in turn is used to power the RF device. This means that there is not a requirement for a direct physical connection. Using the electromagnetic field to charge the RF device has the advantage that there is no requirement for a conductive wire or pad on the RF device that may corrode over time. Alternatively the external power can be designed to directly couple to the device where there is a requirement for a physical connection. There may be communication between the RF device and the external power supply such that the external power supply may be able to indicate to the user the level of charge within the RF device.

The RF devices may contain non-volatile memory to store RF device configuration. This is to prevent loss of the configuration if power to the device is momentarily lost. In addition, the RF device may store at least a portion of the routing tables within non-volatile memory. This facilitates a fast network recovery if power is lost. For example, when an RF device powers up after a power down, it may know which RF repeater 115 or RF device to send communication packets to without the requirement of a broadcast packet or repeating a network routing table discovery phase.

A large cost associated with adding a metering point is the installation cost. Typically this installation cost comprises labor and material cost. There are a number of individual costs associated with installing a metering point in an energy distribution system. The RF devices may reduce or eliminate many of these costs and simplify the installation by using various form factors, powering methods, mounting techniques and installation methods. These methods are further discussed in the following paragraphs.

As discussed earlier, one of these costs is running communication wire to each IED 135 or energy sensor 120. Often installation sites require that any run wire must be enclosed within a conduit. This significantly increases the cost of enabling communication in a device; however, communication is often important to an energy management system. The IEDs 135 and energy sensors 120 may use RF wireless mesh networks. A preferred embodiment is an RF wireless mesh network including of RF repeaters 115 and RF repeater converters 110. In using this wireless network, communication wire need not be brought to each installation point. In fact, an energy management system that uses purely a wireless RF mesh network need not have any communication wire installed; however, in practice, communication wiring may be used in conjunction with a repeater converter 110 that facilitates communication between the traditional communication medium and the mesh network. One example where both communication wiring and RF wireless mesh networks may be used may be where there are existing wired communications perhaps to a substation. In this case, a repeater converter 110 may be connected to the existing wired communication and provide connection to the energy sensors 120 using wireless RF communication packets. In another case, a repeater converter 110 may be used in conjunction with a telephone, cellular, or satellite modem to provide a connection over a large distance to the RF mesh network of energy sensors 120 and other RF devices.

The physical installation of the energy sensor 120 or IED 135 is another significant installation cost. The physical installation typically requires creating a mounting hole or a method of securing the sensor to the measurement cabinet 200*b*. In many cases, a hole must be cut in the measurement cabinet 200*b* for the metering devices display to be mounted.

Additional physical installation costs for an energy sensor 120 or IED 135 installation are inserting the energy sensor 120 or IED 135 into the primary or secondary current loop which means using a CT shorting block or de-energizing the point in the electrical distribution system, breaking the secondary current loop, and adding the new device into the loop. There are significant wiring costs to connect the meter to the current transformer. Even with using a non-intrusive CT there is wiring that needs to be installed and worked around to connect the non-intrusive CT to the metering device during the installation process. In addition, connection must be made to the electrical bus or the potential transformer to measure voltage. In addition, it is often necessary to wire separate control power to the metering device.

The energy sensor 120 and RF devices may reduce these installation costs by using powering technologies already described. These powering technologies may not require a directly wired connection to an electrical power supply. In addition, the energy sensor may incorporate a non-intrusive current transformer (CT) as described in the following paragraphs so that the primary or secondary current loop need not be broken. Further, the energy sensor may incorporate a non-intrusive capacitive voltage detection as described later in the document.

Figure 6:
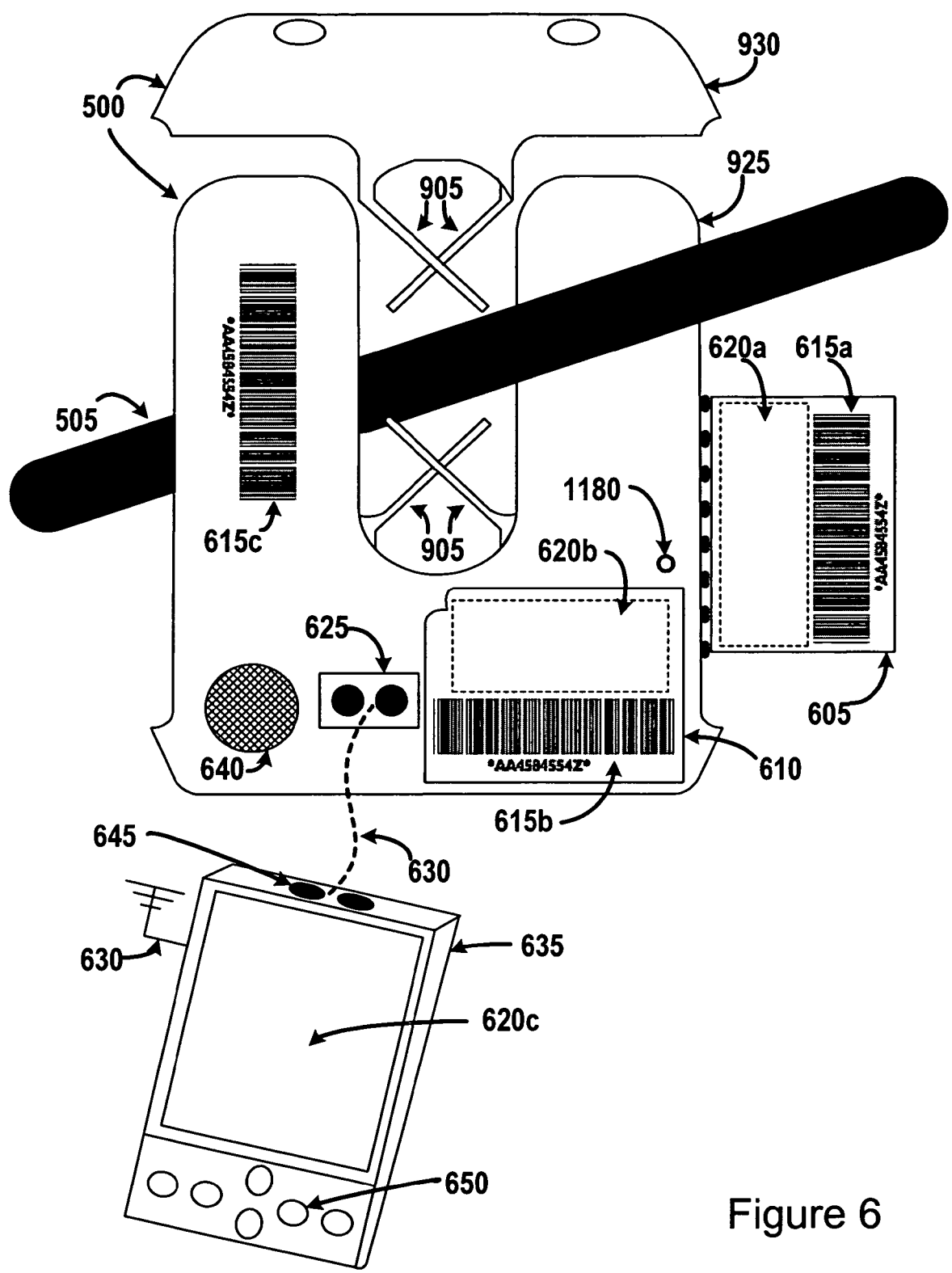
FIG. 6 depicts an energy sensor equipped with various commissioning aids.

The IED 135 and energy sensor 120 may incorporate a non-intrusive CT. This allows simple and inexpensive installation comprising the non-intrusive CT, which incorporates the sensor microprocessor and may incorporate the wireless communication hardware, is separated, slipped over the current carrying wire or fuse, and reconnected to form a CT core around the wire or fuse. FIG. 6 depicts an electrical energy sensor 500 comprised of sections 925 and 930 separated operable for a current carrying wire put inside the 925 section of the electrical energy sensor 500. An electrical energy sensor 500 is an embodiment of the energy sensor 120 used for monitoring electrical energy parameters. The section 930 is coupled with section 925 to form a non-intrusive CT sensor. The electromagnetic field generated by the current carrying wire is captured by the CT and may be used to power the microprocessor in addition to allowing the current carried by the wire to be measured. The electrical energy sensor 500 may incorporate tabs 905 that may be bent when installing the sensor over a wire or a fuse. These plastic tabs are then able to hold onto the wire or fuse due to the friction and pressure created by inserting the wire into the electrical energy sensor 500. As the electrical energy sensor 500 is able to hold its location on the current carrying wire or fuse, it is not required to mount the sensor to any location in the cabinet. In cases where it is desired to monitor two or more phases of current, the electrical energy sensors 500 may have wires that extend from them to one or more other non-intrusive CTs. Alternatively two or more separate electrical energy sensors 500 may be used where these two or more electrical energy sensors 500 communicate their reading wirelessly to a master electrical energy sensor 500 or alternatively to the energy management station or an additional RF device. It is possible for the master electrical energy sensor 500, additional RF device, or the energy management station 100 to correlate these two or more readings.

Alternatively the form factor depicted in FIG. 6 may be used for a RF repeater 115 or RF repeater converter 110. This form factor may allow for an easy method for extending the RF mesh network, as the form factor is able to draw power from the magnetic fields generated by the current carrying wire. This may allow for network range extension over large distances by installing this form factor RF repeater 115 or other RF device over electrical distribution wires. Alternatively, these repeaters may be able to act as RF repeaters 115 for communication, packets and frequencies from other RF systems. Some examples of these RF communications from other RF systems may include but not limited to cell phone frequencies, wireless Ethernet connections, and other radio frequency transmissions. Alternatively, a repeater converter 110 may be used in this form factor to detect power line carrier on the wire and be able to boost the signal, repeat the signal or convert the power line carrier to another communication medium such as the wireless mesh network.

Alternatively, the energy sensor 120 or the electrical energy sensor 500 may be manufactured to fit over a standard high rupturing capacity (HRC) fuse or other type of fuse. The energy sensors 120 may be able to use the fuse resistance to monitor the current flowing through the fuse by compensating for fuse resistance over current and temperature ranges. Alternatively, the energy sensors 120 may incorporate a non-intrusive CT to measure the current flowing through the fuse element. The energy sensors 120 can monitor parameters of the fuse, such as the various levels of current and temperature over time, to determine when the fuse needs to be replaced and the energy sensors 120 may be able to predict fuse failure and transmit fuse failure information over the RF network.

Another embodiment of the energy sensor 120 is incorporating the energy sensor 120 into a breaker. In this case, the breaker has an integrated energy sensor 120 with wireless communications. The wireless communications used in the present embodiments may form a wireless RF mesh network.

Alternative embodiments are building the RF device, such as the energy sensor 120 or RF repeater 115, into a power bar, outlet box, general purpose standard outlet, or Edison light socket. These embodiments have the advantage of ease of installation and monitoring of a specific load.

As described above, a large cost of metering to certain points in an energy distribution system are running communication wires to each point; however, with the wireless mesh network used by the present embodiments only the wireless mesh network extends to the energy sensor 120. Adding active RF repeaters 115 near the existing mesh network border extends the wireless mesh network. Alternatively using repeater converters 110 can extend the mesh network over existing communication means such as but not limited to a modem, Ethernet, telephone, satellite, spread spectrum, or RS485 communication methods. The RF repeaters are simple and inexpensive to install due to the power supply technology mentioned above in this document.

The RF devices may comprise an RF signal strength sensor. This RF signal strength sensor has an indication that measures the signal strength of the RF signal received from another device in the mesh network. In addition, it may indicate if an energy sensor mounted near the RF signal strength sensor may be able to communicate to the mesh network. This may include communication to the energy management station, an RF display device, or another RF device. This indication device may be incorporated within another RF device. This RF strength indication allows the installer or commissioning individual to determine where an RF repeater 115 needs to be installed to extend the network. The RF signal strength sensor may have the ability to indicate the number of independent paths from the current location to the energy management station or any specified location within the mesh network. Using this device, the installer may be able to determine the best locations for RF devices including energy sensors 120, repeaters 115, displays devices 140, and repeater converters 110 as well as the best orientation for the RF device or RF antenna. This device may be used to troubleshoot or add additional routing paths to the network and overall increase the network reliability and robustness. At least a portion of the RF signal strength sensor detection circuit may be implemented within an ASIC chip.

The present embodiments' energy management station 100, RF display device 140, and RF signal strength sensor may have a user display that can show the RF routing paths available between various RF devices. This information can be coupled with the physical location of the device if it is known and the present embodiments are capable of showing the possible routing paths as well as indicating the strength of each RF link. The RF display device 140, RF signal strength sensor and energy management station 100 may be able to analyze this data and indicate the best locations to add repeaters or sensors. Alternatively the installer or commissioner may be able to quickly pick out the best locations for an RF repeater 115 based on the presentation of the routing paths and signal strengths. For example, FIG. 1 is a representation that may be displayed to the installer. Each RF link 150 shown may include an indication of signal strength such as a number, symbol, bar indicators or colors that indicate the signal strength over the communication link 150. In addition, a distance, signal to noise ratio, and error rate of the communication path may be calculated, stored in a database 103, and shown on the diagram. The distance for a communication path may be determined by sending a small communication "distance ping" between two RF devices and determining the distance based on the time the distance ping was sent and received at a RF device, hardware delay, and speed of communication medium.

Reducing the initial commissioning cost and cost of commissioning errors reduces the overall total cost of ownership in metering a point on an energy distribution system. Typically commissioning costs of energy metering points are relatively high. Often there is a need to have a factory representative on site to fully commission a system. In addition, there can be errors that are difficult to correct if the incorrect settings are sent to the metering device. An example of a commissioning error occurs when an electrical monitoring device is set to an incorrect PT or CT ratio for electrical energy monitoring as incorrect primary measurements may be calculated from the secondary measurements. Another example may include setting up an incorrect value per pulse for the monitoring of a pulse output from another metering device. Additional commissioning costs include the manual setup for communication of monitoring devices with the SCADA software. Each metering point connected may have communications configured at the metering point as well as at the software system. Any error in these configurations at either site can result in no communications and may require troubleshooting which further increases commissioning cost. The RF devices may reduce or eliminate many of the costs resulting from the commissioning of an energy sensor 120 or communication device by using automatic device detection, communication configuration and logging of data as described below. In addition, the RF devices may contain automatic or at least partially automatic location methods when commissioning the metering point. These methods are described below.

Referring to FIG. 6, the electrical energy sensors 500 may indicate the direction of energy flow in the wire 505. The direction of energy flow is calculated from the phase detected of the current in the wire with the current CT and the phase of the voltage detected. The energy flow through the electrical energy sensor 500 may be used to indicate a supply or load of electrical energy through a metering point. A quick indication may be performed using two different color LEDs. For example, a red LED may indicate that the energy flow detected on the wire 505 corresponds to a generation or supply of power and the green LED corresponds to a load or demand of electrical power. The installer or commissioning of the electrical energy sensor 500 may be able to determine if the electrical energy sensor 500 is connected in the correct orientation on a wire 505. For example, if the electrical energy sensor 500 is connected to a metering point that should register as a load and the LED illuminates indicating a supply or generation of power, the installer may reinstall the electrical energy sensor 500 the opposite orientation so that the flow of energy flows in the opposite direction through the electrical energy sensor 500. Alternatively a single LED may be used to indicate energy flow direction through the electrical energy sensor 500. This single LED may be able to indicate two different colors or simply indicate one of the two energy flow directions if illuminated and the opposite energy flow direction if not illuminated.

The RF devices and energy management station 100 may be operable to detect a new RF device when it is activated within the communication range of the mesh network. Using auto detection, the energy management station 100 may be able to auto configure all communication settings. In addition, the energy management station 100 and the RF devices may be able to automatically determine the routing method to use to communicate as well as alternate routing if available. As soon as the energy management station 100 has automatically detected and configured communication to the energy sensor 120 or IED 135, it may be operable to start querying at least one reading or configuration setting of the RF device. These readings and configuration settings may be recorded in database 103 along with a device identification code. These recorded configuration settings may be used to detect configuration changes within the device or to assist in compensation for reading or displaying data recorded when incorrect configuration settings were used. The device identification code may be used to assist in locating the device within the energy distribution diagram or within a physical location. In addition, the energy management station 100 may allow a retroactive configuration change to be made. This means that if an error in the configuration of the RF device or energy sensor 120 is detected after some logging has taken place, the energy management station 100 may be able to calculate and correct logged parameters in the database 103. Alternatively the energy management station 100 may be able to calculate corrected data and display this data to the user.

The energy management station 100 is coupled with a database 103 used to log data from the energy sensors 120 and energy information that may be at least partially derived from the data retrieved from the energy sensors 120. The energy management station 100 may monitor and log the configuration and routing paths of the wireless network and any of the RF devices within the wireless network range. The energy management station 100 may be configured to auto detect any new repeater converter 110, repeater 115, sensor 120, or RF display device 140. When the energy management station 100 detects a new RF device, it may automatically add it to its routing table and determine which other RF devices are within range of the new RF device. The energy management station 100 may uses this information to modify the routing table to have more efficient communications. As cost may also be a factor within the network such as when there is a satellite, long distance carrier, or cellular phone connection within the routing, the energy management station 100 allows the operator to set an indicator representing the cost associated with certain communication links. The energy management station may be capable of trying to reduce costs in the communication routing by evaluating the cost of various paths. In addition, the energy management station 100 may be able to pick the most reliable and quickest routing path based on recorded history of alternate communication links. Alternatively at least a portion of the RF devices, contain routing intelligence and determine the best path for at least some of the communication. This may be done via a collaboration protocol or frequency between the RF devices. Using this auto-detect and auto configuration technology, the network is able to adapt to changes in the network such as new RF devices, failed RF devices, or inadequate power supply to an RF device.

An important process in commissioning is programming the location of the monitored devices into the energy management station 100 or the Supervisory Control and Data Acquisition (SCADA) software. Location of the energy sensor 120 may be the physical location or the point the energy sensor 120 is monitoring on an energy distribution network diagram (one line diagram). A one-line diagram is a standard term for a simple block diagram showing the energy distribution system. Alternatively, the physical location of the device may be preferred such as the building number, floor number, substation number, or geographic coordinates. Typically both the physical location and the point in the energy distribution system that the energy sensor 120 is monitoring are useful. It may also be useful to record the location of other RF devices within the communication network during commissioning. To reduce commissioning time and thereby reduce cost of ownership, the RF devices automate this process through various methods and alternatively provide some standardized record keeping for IED 135 and RF devices. The techniques used to automate and simplify the ability to locate RF devices, energy sensors 120, and IED 135 are discussed below.

Referring now to FIG. 6, a number of commissioning location devices are depicted. The RF devices, such as energy sensors 120, and IED may contain an identification tag. This identification tag may be represented by a barcode number 615 or may be embedded in a MAC address, or comprise some other at least semi-unique identification code. The identification tag may be stored within the memory of the RF device and may be retrieved via communications to the RF device. For example, the energy management station 100 may be able to retrieve a RF device's identification tag over the mesh network. There are other alternatives that can be used as an identification device or method such as Radio frequency identification (RFID). For example, any string capable as being used as a unique or at least semi-unique electronic fingerprint such as a serial number or a MAC address may be used to uniquely identify one device out of a number of RF devices. This identification code may be present on a removable portion of the RF device such as a peal-off label 610 or a break-off label 605. The identification code may be represented by a barcode 615*a* on the break off tag 605, a barcode 615*b* on the peel off tag 610, or on the RF device itself as a barcode 615*c*. These labels may have an area 620*a* or 620*b* that can either be used for taking notes on the location of the RF device or required RF device settings. The information may be recorded in a manner that can be automatically read by the energy management station 100 such as a computer punch card or alternatively the energy management station 100 may be able to recognize symbols or handwriting in the area 620*a* or 620*b*. Information that may be recorded consists of items such as building, floor, bus, feeder etc. An example commissioning method using these break-off tags 605 or peal-off tags 610 consists of the energy sensor 120 or RF device being connected to a point in the energy distribution system, such as a current carrying wire, the commissioner of the RF device may break off a tag 605 or peel off a tag 610 and take notes on the tag in the areas 620*a* or 620*b*. Later at the energy management station 100, the tag 605 or 610 is read into the energy management station 100 and any notes or RF device settings on the tag are either automatically read in or manually entered in. The energy management station 100 may be able to read the bar code 615*a* or 615*b* on the tag and match the settings or location to the RF device within the mesh network or communication ability of the energy management station 100.

Referring to FIG. 6, an optical port 625 is shown on the RF device or energy sensor 120. A handheld computing device 635, such as a WinCE™ or PalmOS™ device, may be able to establish an IRDA or other type of optical communication link 630 via the optical port 645 to the RF device or energy sensor 120 on the optical port 625. Alternatively a laptop, palmtop, or cell phone may be used to establish a communication link 630 to the RF device or energy sensor 120. Alternatively the communication link may be hard wired or using a limited range RF communication. The handheld device 635 may be able to record the identification tag represented by the barcode 615 from the energy sensor 120. Alternatively the handheld device 635 may be able to read the Radio frequency identification (RFID). Alternatively the handheld device 635 may read the bar code 615*c* on the energy sensor 120 to record the identification tag. The operator of the handheld device 635 may be able to enter any location or setting notes into the handheld device 635. This information may be added using the area 620c or the keyboard 650. This information can either be immediately sent over the RF mesh network to the energy management station 100 or recorded in the handheld device 635 and synchronized to the energy management station 100 at a later time. Alternatively the handheld device 635 may comprise at least a part of the energy management station 100. The handheld device 635 may contain an RF device and be operable to communicate directly on the RF mesh network. Alternatively, the handheld device 635 can connect to the RF mesh network via the IRDA communication link 630 made to the RF device. The handheld device 635 may be able to integrate itself into the mesh network and report s the identifications of the units around it. The handheld device 635 may be able to display routing information from the energy sensor 120 to the energy management station 100 in addition to the RF strength and RF robustness of the network between the RF device or energy sensor 120 and the energy management station 100.

The installer or commissioner of the RF device can make use of a GPS (Global Positioning System) to determine the location of the metering point. This information may then be recorded on the break-off tag 605, peel-off tag 610, or handheld computing device 635. Alternatively, the location information may be recorded by the installer manually and entered into the energy management station 100. A preferred embodiment may include the GPS system 630 coupled with the handheld device 635 with the physical location being automatically recorded in the handheld device 635. Alternatively another positioning system may be used as the GPS system 630 may not function correctly at some install sites.

The energy management station 100 may be operable to estimate the physical location of the RF device using triangulation. This is done by using the RF mesh network and existing knowledge of the location of at least one other RF device. The location detection is completed using RF devices at known locations, speed of RF transmission, as well as the strength of RF transmission from an RF device at a known location to the RF device.

A camera may be used to further indicate the RF device position and install location. A digital camera can be coupled with the handheld device 635. This image may be communicated via a communication link to the energy management station 100.

As depicted in FIG. 6, a microphone 640 is included in the RF device or energy sensor 120. This microphone may contain an actuation button and can be used by the installer of the RF device to record a brief message. This message can be used to determine the location of a energy sensor 120 or RF device and the recommended settings for the RF device. The energy sensor 120 may use the RF mesh network to transmit the message to the energy management station 100 for retrieval by an operator at the energy management station 100. Voice communications may be transmitted in between two RF devices or an RF device and the energy management station 100. Alternatively, the energy management station 100 or the RF device may use voice recognition to determine the location from the installers message.

Figure 7:
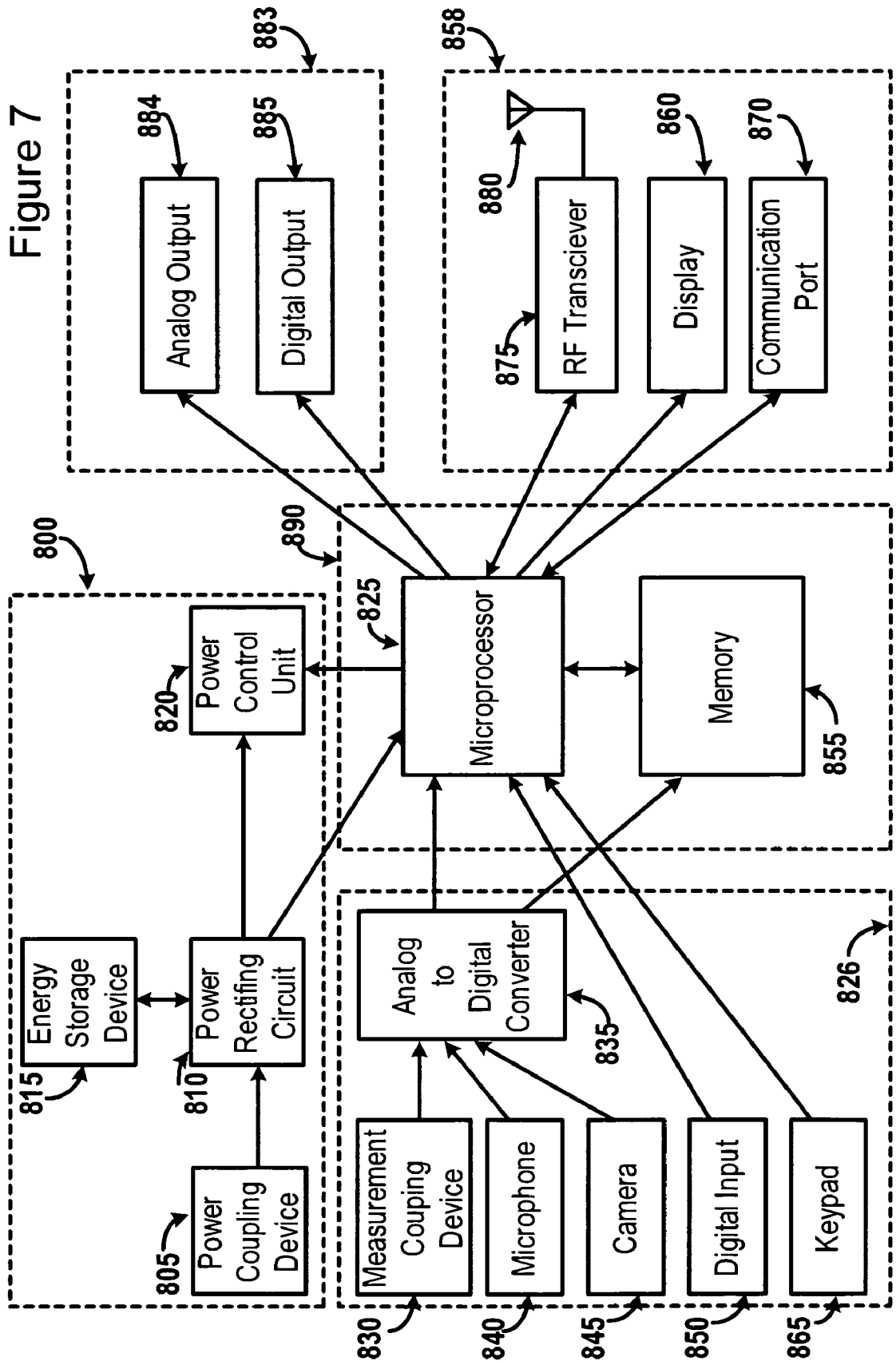
FIG. 7 depicts a block diagram of an energy sensor.

Referring to FIG. 7, a block diagram of the internal components that may be used in an energy sensor 120 is depicted. The energy sensor 120 and other RF devices such as the RF repeater converter 110, RF repeater 115, RF display device 140, and RF strength sensor may be derived from a limited combination of the internal components of a full featured energy sensor 120 described below.

The energy sensor 120 may contain five sections, a power section 800, a measurement section 826, a communication section 858, control section 883 and a processor section 890. Each of these sections is discussed in more detail below. The energy sensor 120 may be completely implemented within an ASIC chip or alternatively any combination of the blocks described to make up the energy sensor 120 may be implemented within an ASIC chip.

The power section 800 may comprise of a power coupling device 805, a power rectifying circuit 810, energy storage device 815, and a power control unit 820. The power-coupling device 805 is used to couple with the alternate power source. This may be but is not limited to a thermal electric generator, solar panel, electrical power, battery, vibration generator, or alternate energy converter used to harness one of the other alternate power supplies as described above in the power supply section in this document. The power rectifying circuit 810 is used to convert an alternating or fluctuating power source to a more stable DC power source. It may use the energy storage device 815 to store excess energy that in turn is able to supply power when the alternate power source is unable to supply required power for the device. The energy storage device 815 is typically a super capacitor or rechargeable battery. The power control unit 820 is controlled by the microprocessor 825. The microprocessor 825 may be able to monitor the energy available via the power rectifying circuit 810 and determine how much power each component in the energy sensor 120 is to receive via the power control unit 820. Alternatively, the power control unit 820 may contain a microprocessor and be operable to control at least part of the power distribution within the energy sensor 120.

The measurement section 826 may comprise a measurement-coupling device 830, an analog to digital converter 835, a microphone 840, a camera 845, a digital input 850, and a keypad 865. The measurement-coupling device 830 may be used by the sensor 120 to make an analog measurement of an energy parameter. The A/D 835 converts this energy parameter from an analog signal to a digital signal. The microphone 840 is used to convert a sound recording to an analog signal. The A/D 835 may convert this to a digital signal. The microprocessor 825 may be able to store the sound recording in memory 855 and may be able to transmit the information recorded to the energy management station 100 or another RF device. Similarly, the camera 845 may be used to record an image or stream of images that may be stored in the memory 855 and may be transmitted to the energy management station 100 or another device. The digital input 850 couples with the microprocessor 825 and may be used to monitor the status of a switch, a breaker, or to monitor pulses from another metering device such as a flow meter, gas meter or electrical meter. The keypad 865 can be used to switch displays or make a change in the setup of the RF device.

The communication section 858 may comprise a display 860, communication port 870, RF transceiver 875 and RF antenna 880. The microprocessor may use the display 860 to provide information to the user such as measurement parameters, setup information, and measurements. The communication port 870 may contain more than one communication channel. The communication port 870 may be used to drive the IRDA port and in addition another communication port 870 may directly coupled to an Ethernet, modem, power line carrier, or serial port. The RF transceiver 875 may be used by the microprocessor 825 to transmit and receive communication packets wirelessly on the RF mesh network. Alternatively, the RF transceiver 875 may be separated from the sensor 120 and may couple with the microprocessor 825 through the communication port 870.

The control section 883 may comprise an analog output 884 and a digital output 885. The analog output 884 may be used to transmit the measurement information via an analog signal to another device or be used to perform a control function such as but not limited to controlling a thermostat. The digital output 885 can be used to transmit the measurement information in the form of pulses or to perform a control action such as but not limited to tripping a breaker, resetting a breaker, turning on an alarm, etc.

The processing section 890 comprises a microprocessor 825 and a memory 855. Some of the tasks the microprocessor 825 is used for include storing and reading data within the memory 855, coordinating the power distribution in the sensor 120 via the power control unit 820, creating and reading communication packets, encoding and decoding the communication packets for the wireless network, and reading measurement via the A/D 835.

The memory 855 may be used to store any communication packets created by the microprocessor 825 or received from another RF device 200 within the memory 855. The communication packet would be held in the memory 855 until such time they are transmitted on the mesh network or an acknowledgement is received that the packet has been received by another RF device 200 or by the energy management station 100. These stored packets may consist of packets generated within the microprocessor 825 or communication packets received from another RF device being held for retransmission on the mesh network. If a transmission was received acknowledging that a received packet was either retransmitted using another RF device or acknowledgement from the target device was received, the stored communication packet may no longer be held for transmission. There may be a direct link between a component in the communication section 858 and the memory 855 to better facilitate this transfer of communication packets for storage. Alternately, the communication section 858 may make use of a separate memory area for storage.

This storage of communication packets may occur if the power control unit 820 logic shuts down any outgoing RF transmissions due to the power requirement to make such a transmission and where the communication packets created by the microprocessor 825 or received over the mesh network are stored until sufficient power is available to make the RF transmission. Any communication packet 1000 received over the mesh network or data created by the microprocessor 825 may be stored directly in the memory or processed by the microprocessor so that only relevant, important or high priority data is stored within the memory 855 or that the data or communication packet is compressed before storage.

At least some data within the communication packet 1000 that is received or created by the RF device 200 may be stored within a memory in the RF device 200. This data may be stored until the space allocated within the memory 855 to store such data nears capacity, the data is deemed irrelevant, or a communication is received by the RF device 200 that the data was received by the target RF device 200 or the energy management station 100. The energy management station 100 or target RF device 200 may send out a periodic communication packet 1000 that indicates a least one specific communication packet 1000 was received. If this communication packet 1000 is received by a RF device 200 holding a at least a piece of the communication packet 1000 referenced, the RF device 200 may delete or mark the for deletion any data stored for the referenced communication packet. Intermediate RF devices 200 may send a similar communication packet 1000 to the mesh network indicating the data it has received and is holding until acknowledgement is received that the original communication packet 1000 reached its destination. A RF device receiving this communication from an intermediate RF device 200 that is closer to the target RF device 200 or energy management station 100 may similarly delete or mark for deletion any data it is storing from the reference communication packet 1000. Alternately any RF device 200 that receives a packet acknowledging receipt of a communication packet 1000 may log the fact that the data is being held at another RF device 200 but not immediately delete or mark for deletion the referenced communication packet 1000.

The data integrity function in the RF devices 200 may delete or mark for deletion data in a non chronological manner. For instance, if a specific RF device 200 holds data for every fifteen minutes for the last day and has been unable to transmit this data to the energy management station 100 or another RF device 200 to be stored and the memory allocated to store the fifteen minute interval data is reaching capacity, rather than deleting the oldest data in the memory, the data integrity function may remove intermediate data such as every other fifteen minute data so that while data is being lost by the system there remains a distribution of data over the whole range. Eventually, the memory may only contain data with a half an hour interval or hour interval. The data integrity function may alter the remaining records such that data is not completely lost. For example, if average energy usage over a set interval was to be deleted, the data integrity function may merge the data with the next record in the memory log. Alternately, if the maximum demand over an interval was to be deleted, the data integrity function may modify the next chronological record to store the maximum of its recording and the recording to be deleted. Alternately, instead of the complete log entry for a specific timestamp being removed, the data integrity function may only remove specific data such as the lowest energy demand reading from the memory logs.

Alternately, the data integrity function may limit or reduce the number of bits of memory used to store numeric values and thus effectively reduce the number of significant figures within a numeric record. For example, rather than using 8 significant figures to store an accumulated energy reading, the data integrity function may dynamically reduce the number of significant figures in a data log storing only 7 significant figures and thus freeing up a few bits of memory space for each record stored. The number of significant figures or number of data bits used to store a value may be recorded by the RF device 200 and the energy management station 100 to indicate a confidence value to the stored reading in the database 103.

The microprocessor 825 may be operable to perform energy calculations at a metering point and store the energy values in the memory 855. In addition, it may be able to control the power distribution within the energy sensor 120 through the power control unit 820. In addition the microprocessor is able to encode and decode the communication packets sent over the RF transceiver 875.

Figure 8:
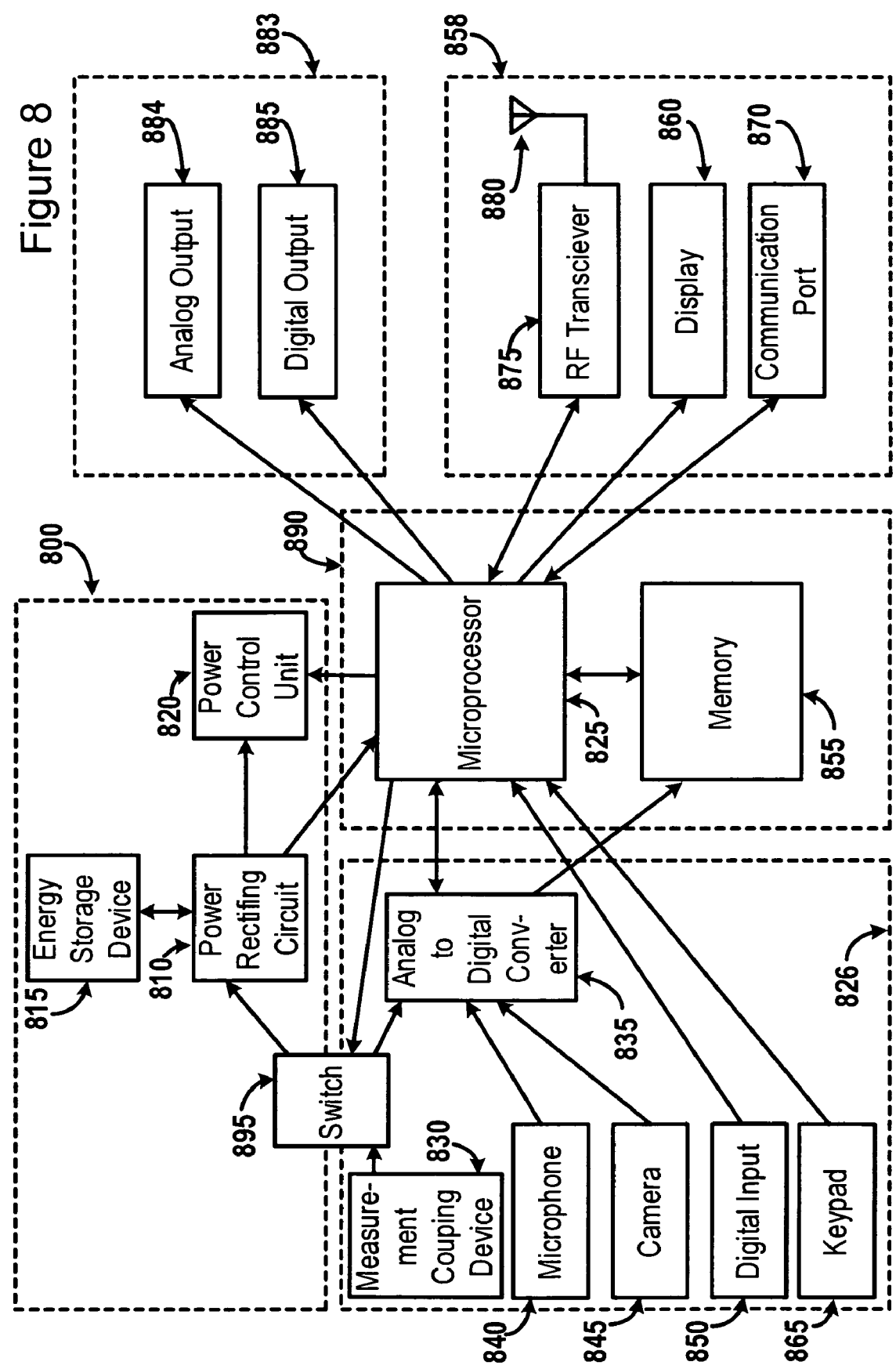
FIG. 8 depicts a block diagram of an energy sensor utilizing power derived from the measured energy signal to power the metering device; and, FIG. 9 illustrates an exemplary flowchart for monitoring data quality for an energy management system.

Referring to FIG. 8, the measurement-coupling device 830 doubles as a power-coupling device 805. For example, the energy sensor 120 may incorporate a non-intrusive CT and be used to monitor electrical current in a non-intrusive manner such as the electrical energy sensor 500 shown in FIG. 6. The current induced in the measurement-coupling device 830 (non-intrusive CT) may be switched to the power rectifying circuit 810 or the analog to digital converter by a switch 895. Typically, when a measurement is being taken, the output of the measurement-coupling device 830 is switched by the microprocessor 825 to the analog to digital converter 835 to reduce the CT burden of the energy sensor 120, during this time, the energy sensor 120 is powered from the energy storage device 815 otherwise the current is switched to the power rectifying circuit 810. The energy sensor 120 is able to measure the current flowing through the conductor 900 that passes through the center of the sensor 120. As shown in FIG. 6, the current carrying wire may be held in place by the tabs 905 effectively holding the sensor to the current carrying wire. The electrical energy sensor 500 embodiment of energy sensor 120 may contain two main separable pieces, 925 and 930. The section 925 may contain all the electronics as well as a large section of the non-intrusive CT; however, it is possible for both sections to contain the electronics. The remaining section 930 can be removed so that the electrical energy sensor 500 can be placed around the current carrying wire at which time the section 930 is connected to the section 925 which in combination comprises a CT core around the current carrying wire 900.

The indication of the actual voltage may be supplied over a RF link or by an operator. The operator may use a standard voltage meter to measure the voltage and input the measured value into the electrical energy sensor 500, a handheld unit 635 or energy management station 100. Alternatively, there may be voltage leads or voltage terminals on the energy sensor 500 that allows direct measurement of voltage. This may allow the computation of additional power parameters in the electrical energy sensor 500 such as kW, kVAR, kVA, etc.

The electrical energy sensor 500 may be able to use a specified voltage and power factor to calculate energy and power information from the current readings of the electrical energy sensor 500. An electrician may specify the voltage and power factor. Alternatively the power factor may be able to be determined using a voltage phase detection with a capacitive voltage detector as described above. Alternatively, voltage may be provided to the electrical energy sensor 500 from another IED device that may be monitoring voltage at another location where the voltage in the wire can be derived. This may be calculated by using a known voltage on another bus and the PT ratio or electronic equipment used to couple the two electrical busses together. Alternatively, the calculations for power factor, voltage, energy, and power may be done in the other RF devices such as the RF display device 140. Alternatively the handheld device 635 or the energy management station 100 may be used.

The energy sensor 120 may be able to monitor any meter, such as a water, air, gas, electric or steam meter, via the digital input or an analog sensor used as the measurement coupling device 830 and wirelessly transmit the data to another RF device or the energy management station 100.

The energy management station 100 may be software residing on a computer, handheld device 635, or firmware residing on an intelligent electronic device (IED) such as IED 135. The energy management station 100 is coupled with a repeater converter 110*a* that allows it to communicate over the network and receive data from the energy sensors 120 within the wireless mesh network. Alternatively, the energy management station 100 is able to communicate directly on the RF mesh network. The energy management station 100 is operable to receive power up and power down messages from the RF devices and alert the system operator.

The energy management station 100 may automatically detect new RF devices added to the mesh network or added within the communication range of the energy management station such as through a serial connection, existing modem connection, wireless transceiver, Ethernet connection, or a combination of these communication mechanisms or other communication mechanisms. The energy management station 100 may automatically configure communication with the RF device and may immediately start to record configuration, identification, and measurement data from the RF device or energy sensor 120 into the database 103. If the configuration data is changed in the future, the option may be made available to make the change retroactive within the database. This allows the correction of any setup error or delay in the entry of the configuration settings.

The data that is collected at the energy management station 100 in the database 103 may be used for energy cost analysis. The RF devices may reduce the cost of ownership of each metering point and therefore may allow many additional metering points monitoring energy further down the energy distribution system closer to the individual loads. This allows a large amount of data to be known throughout the complete energy distribution system. The energy management station 100 may be able convert this data to energy distribution system knowledge and may present it in such a way as to make the economic consequence of various energy consuming loads, energy storage, and energy generation clear to the system operator. This allows the system operator to make informed decisions concerning the use of energy dollars within a facility.

It may be possible to have additional energy management stations 100 within an energy distribution monitoring system. A preferred embodiment utilizing more than one energy management station comprises stations that may coordinate communication activities with one of them taking on the role of a master station and the others as client stations. An alternative embodiment of using more than one energy management station 100 comprises at least one of the additional energy management stations 100 acting independently of the rest, logging, displaying, analyzing, and alarming on the data independently.

The energy management station 100 may be able to send a known or specified voltage and power factor to an energy sensor 120. This may allow the energy sensor 120 to calculate energy and power information from the current sensed in a current carrying wire. Alternatively the additional calculations to determine the power and energy parameters may be done at the energy management station 100 either as the real time values arrive or at a later time based on the data collected from the energy sensor 120. The voltage may be a specified by the system operator or alternatively the energy management station 100 may be able to estimate the voltage based on the voltage read through another energy sensor 120 or IED 135 that it is able to communicate to. In addition, the energy management station 100 may be able to analyze the supplied energy distribution system and calculate the voltage passed through various transformers, breakers, or switches to determine what the voltage may be at the energy sensor 120. For example, if the voltage can be measured at a 480V bus the energy management system may be able to recognize a transformer on the one line energy distribution network diagram and determine what the voltage might be at the load side of the bus where the energy sensor 120 is installed. These calculations may include transformer and line loss calculations. Similarly it may be able to estimate power factor using this method as well as knowledge of the load and the electrical components between the power factor that is being measured and the load.

The voltage, phase, and current readings may be used to calculate other energy and power parameters such as kW, kVAR, and kVA. The voltage and phase may be specified by a system operator, measured from another energy sensor or voltage meter, or be calculated based on various specified and measured values throughout the energy distribution system as discussed above. The energy management station 100 may be operable to store the measured, specified, and calculated parameters within the database 103. Alternatively the RF devices may be able to store these parameters within an internal database. These parameters may include a measured current, specified power factor, specified voltage, calculated kW, calculated kVAR, and calculated kVA. Alternatively the voltage phase may be detected using the capacitive voltage detection discussed above. The voltage phase may be used to calculate the power factor. In addition, the capacitive voltage detection may be able to determine a change in the line voltage from the specified voltage. If available, the measured voltage and calculated power factor may be stored in the database and may be at least partially used in the energy and power calculations. Other information may be stored in the database 103 such as specified error tolerances for specified values and calculated error tolerances for calculated and measured values. In addition, timestamp information, physical device location, device identification, other energy parameters, energy events, etc may be stored within the database 103.

The energy management station 100 may be able to access the RF signal strength within each wireless connection on the mesh network and estimate the coverage of the mesh network. It may be able to display this information on a geographical map showing the estimated and measured coverage of the RF mesh network. The RF signal strength, error rate, signal to noise ratio and utilization of each wireless connection may also be represented on the diagram. Alternatively this information may be displayed on an energy distribution diagram. In addition, the energy management station 100 may be able to analyze the mesh network and based on signal strength and error rate, and may be able to suggest where an RF repeater 115 may be located to increase the coverage and robustness of the network.

The energy management station 100 may be able to perform an upgrade on an RF device over a wireless link. Preferably this wireless link is an RF mesh network and at least one routing path may exist between the RF device and the energy management station 100. Alternatively, a portion of the communication path may be an alternate communication medium such as an Ethernet connection. In addition, if more than one routing path exists to the RF device, it may be possible for a faster communication rate and thereby a faster firmware upgrade to the device. The RF devices may be able to signal to the energy management station 100 if they have sufficient backup power for a firmware upgrade in the event that an external power supply fails.

Figure 5:
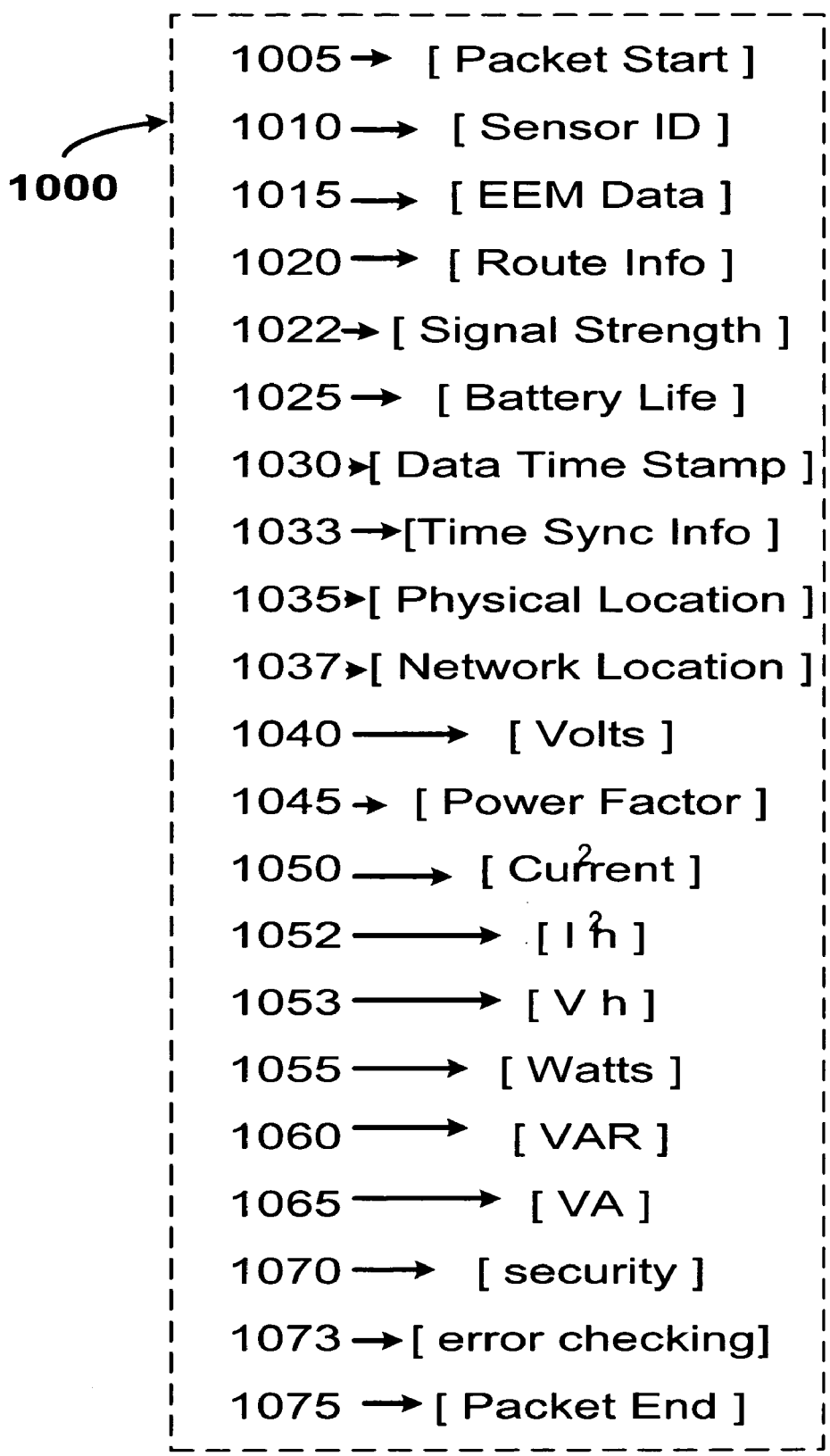
FIG. 5 depicts some of the general components within an RF data communication packet payload.

The microprocessor in the energy sensor 120, RF devices, and the energy management station 100 may assemble the RF communication data packets 1000. In addition the microprocessor 825 in the energy sensor 120 may be able to calculate energy parameters as well as construct, encode and decode RF communication data packets 1000. This RF communication data packet 1000 may be optimized for efficient, high speed, low collision communications. In addition, the communication data packet 1000 may be highly flexible in that it may contain only a few energy parameters to a large amount of energy parameters and from only a few pieces of routing information to a large amount of routing information. As shown in FIG. 5, some of the information that may be contained within the RF wireless payload includes a packet start marker 1005 or preamble, sensor ID 1010, EEM data 1015, routing information 1020, signal strength 1022, battery life 1025, time of data collected 1030, time sync information, physical location 1035, energy distribution metering location, volts 1040, power factor 1045, current 1050, I2R 1052, V2h 1053, watts 1055, VAR 1060, VA 1065, public security key 1070 error codes 1073 and a packet end marker 1075.

The error codes 1073 may comprise of a cyclic redundancy error checking or preferably contain forward error correction. The forward error correction may be used by the receiving RF device or energy management station 100 to correct information in the data packet that may have been corrupted during transport. Using forward error correction may increase the wireless mesh network range, decrease the required RF antenna, decrease the transmit power required at each RF device and assist in any corruption of the data packet occurring during transport such as transport over long distances or outside of a partial RF shield. The RF devices may be able to intelligently assemble the information in each packet so not to include redundant or unnecessary information within the RF payload. A RF device or energy management station 100 may assemble a communication data packet 1000 to be used as a time sync another RF device or energy management station 100. An RF device or energy management station 100 receiving or processing the communication packet 1000 containing the time sync, may be able to adjust it's time to correspond to the time sync sent in the communication packet. The time syncing process may account for any packet decoding delays and speed of communications. The communication packet 1000 may be digitally signed and may use a private key and public key signing system. Alternatively the communication packet 1000 may be digitally encrypted and may use a private key and public key exchange between two or more RF devices including the energy management station 100.

Figure 2:
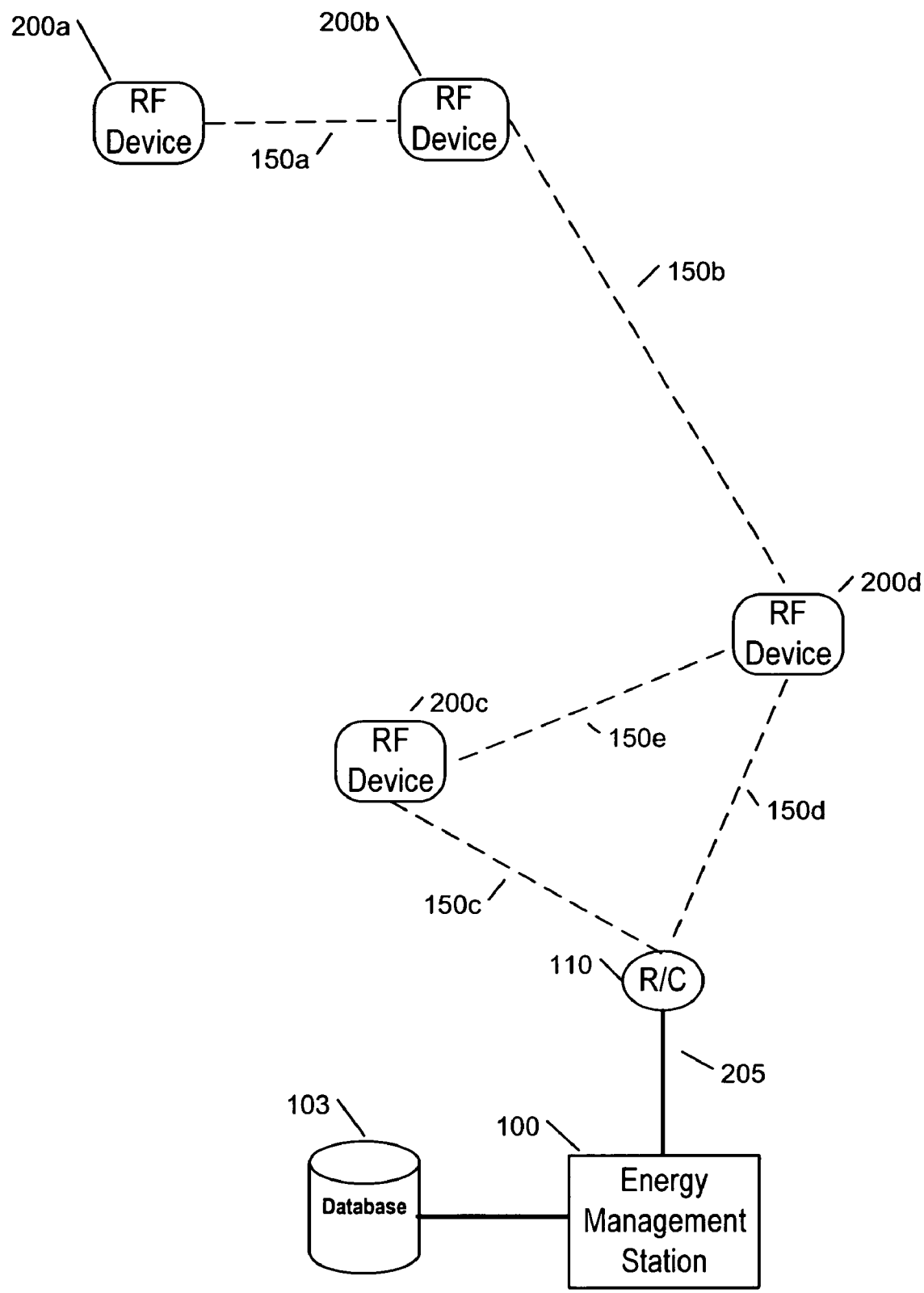
FIG. 2 depicts an embodiment of a communication diagram depicting mesh communication links.

Referring now to FIG. 2, an example of a communication diagram is show that depicts radio frequency ("RF") devices communicating on a wireless mesh network. The wireless mesh network composed of radio frequency ("RF") devices 200 used to transmit communication data packets between the energy management station 100 and the RF devices 200. An RF device 200 includes at least one of RF repeater converter 110, RF repeater 115, energy sensors 120, RF signal strength sensors or RF display devices 140. This figure shows RF device 200*a* linked to RF device 200*b* over wireless communication link 150*a*, and RF device 200*b* linked to RF device 200*d* over communication link 150*b*. RF device 200*d* is linked to RF device 200*c* over communication link 150*e* and to the repeater converter 110. RF device 200*c* is linked to repeater converter 110 over communication link 150*c*. The repeater converter 110 is linked to the energy management station 100 over a direct link 205. The energy management station 100 is connected to a database 103.

With any communication network tying together energy sensors, it is important to ensure the robustness of the network. Typically this is sometimes taken for granted with a wired communication system; however, even in a wired case problems may appear and data can be lost. With a wireless network, especially a low powered, adhoc network such as mesh wireless communication system, critical paths may be disabled and communication between energy sensors and energy management station or data storage location may be delayed. In a wireless communication network, especially an ad-hoc mesh network, there may be additional reasons to employ a communication validation function. A communication validation function may provide a measure of robustness or redundancy between communication paths.

This may be during the commissioning of a system to ensure better operation after the commissioning process.

The present embodiments' energy management station 100, RF display device 140, and RF signal strength sensor may have a user display that can show the RF routing paths available between various RF devices. This information can be coupled with the physical location of the device if it is known and the present embodiments are capable of showing the possible routing paths as well as indicating the strength of each RF link. The RF display device 140, RF signal strength sensor and energy management station 100 may be able to analyze this data and indicate the best locations to add repeaters or sensors. Alternatively the installer or commissioner may be able to quickly pick out the best locations for an RF repeater 115 based on the presentation of the routing paths and signal strengths. For example, FIG. 2 is a representation that may be displayed to the installer. Each RF link 150 shown may include an indication of signal strength such as a number, symbol, bar indicators or colors that indicate the signal strength over the communication link 150. In addition, a distance, signal to noise ratio, and error rate of the communication path may be calculated, stored in a database 103, and shown on the diagram. The distance for a communication path may be determined by sending a small communication "distance ping" between two RF devices and determining the distance based on the time the distance ping was sent and received at a RF device, hardware delay, and speed of communication medium.

There is a need to represent link quality between nodes using a simple measure. While the link quality can be disclosed using signal to noise ratio or bit error rate, the meaning of these terms are not always well understood by operators. A way to compile this data or engineering measures to a common link quality indicator is important. One method of representing the link quality between nodes can be through a number of nines indicator. For example, 2 number of nines may indicate that 99% or 99 out of 100 communication packets are successfully transmitted over the link. This could be referred to as probability of success. The communication validation function may be able to indicate the number of nines between two individual nodes directly or between two individual nodes using a network of intermediate nodes.

This representation of link quality may be able to indicate were wireless mesh repeaters need to be moved or added to increase the robustness of the mesh network while keeping the costs of adding additional repeater low. The communication validation function may be able to include redundant intermediate paths using various intermediate nodes between two communicating mesh nodes or a mesh node and the energy management system within the calculation of link quality indication.

The communication validation function may alarm when one or more communication links throughout the energy management system fall below a certain link quality. The alarm may be triggered by a percentage drop in the link quality from a normal or average link quality for a specific communication link or when the link quality passes a preset threshold. This link quality may be a representation such as the number of nines discussed above or signal to noise ratio measured between two RF devices. The communication validation function may alarm when communication to a node or through a communication path is no longer viable.

One way the communication validation function may ensure a good wireless communication network is to track the path taken by at least some of the packets.

Each RF device 200 may add a marker to packets it passes. The marker may be a few bits of information incorporated within or added on to either end of the communication packet 1000. The route information 1020 within the communication packet 1000 may be used to contain this "route taken" information.

Alternatively, each RF device 200 may simply store an identification information from the communication packet to indicate that it received the packet. This identification information may be stored in the RF device 200 along with course of action information. For example, each RF device 200 may contain a log containing identification of each packet it received or created, where the packet was received from, time the packet was received, and what action was taken such as retransmitting the packet to the mesh network. This communication log may be transmitted to the energy management station 100 at a preset interval or upon request from the energy management station 100. Alternatively, the communication log may be transmitted due to an failure within the mesh network or RF device 200. The communication log may either be pushed from the RF device 200 to the energy management station 100 or be requested by the energy management station 100. The communication log may be used by the communication validation function to track the use of the mesh network.

The communication verification function may be able to indicate the existence, usage and reliability of wireless links formed within the mesh network. For example, in FIG. 2, through analyzing the path at least some of the communication packets 1000 took, the communication verification function may be able to indicate that communications paths 150a-150e as shown connect RF devices 200a, 200b, 200c, 200d and the repeater converter 110. In addition, the communication verification function may be able to determine the number of proven paths a specific RF device 200 may be able to use to communication to the energy management station. For example, RF device 200d may use mesh link 150d to communication directly to the repeater converter 110 or may use wireless link 150e, RF device 200c, and wireless link 150c to communicate to the repeater converter 110. The communication verification function may be able to determine critical paths such as indicated by RF device 200b with only one wireless link 150b to get information to RF device 200d and the rest of the network. Conceivably, if either wireless path 150b or RF device 200d were not functioning properly or unavailable, the data in RF device 200a and RF device 200b would be unable to reach the energy management station 100. The communication verification function may be able to detect this possibility of only one critical path and take action such as create an alarm or indication to the user. The number of redundant paths required may be set by the user or commissioner of the system. For instance, the system may be set to ensure that there are at least 3 independent paths.

The communication verification function may temporarily disable certain wireless paths to check if the mesh network is able to generate a backup or redundant path. The command may indicate to only stop for a set amount of time or to stop until another command is received to resume. Before temporarily disabling the communication link 150, the communication verification function may send a command to a device to transmit a message at a regular interval. By temporarily disabling a certain wireless path or a RF device 200 from repeating any mesh signals, the communication verification function may be able to find out if an alternate path exists. For example in FIG. 2, the communication verification function may send a message to RF device 200a or RF device 200b to transmit a packet to the energy management station 100 at a regular interval 1 minute interval. The internal may be set to any length. Then the communication verification function may send a signal or communication packet to RF device 200d to stop retransmitting packets on the mesh network or the instruction may be more specific to stop transmitting packets sent from RF device 200b to the mesh network for 5 minutes. By effectively disabling the communication path 150b, the communication verification function is able to verify if the mesh network is able to adopt and determine if there is an alternate path. For instance, in the example above, the mesh network may find an alternate wireless path between RF device 200a and RF device 200d in which the wireless path 150b is not critical to operation but perhaps RF device 200d is critical. Further the communication verification function may send a command to RF device 200d to temporarily stop repeating any mesh communication from either RF device 200a or RF device 200b. In this case, the communication verification function may be able to determine if there is a link between RF device 200a or RF device 200b to any other the other RF devices 200 besides RF device 200d. The communication verification function may alarm or set off an alarm within the energy management system 100. The alarm may be transmitted over the wireless mesh network to a handheld device or mobile indicator 140.

Figure 3:
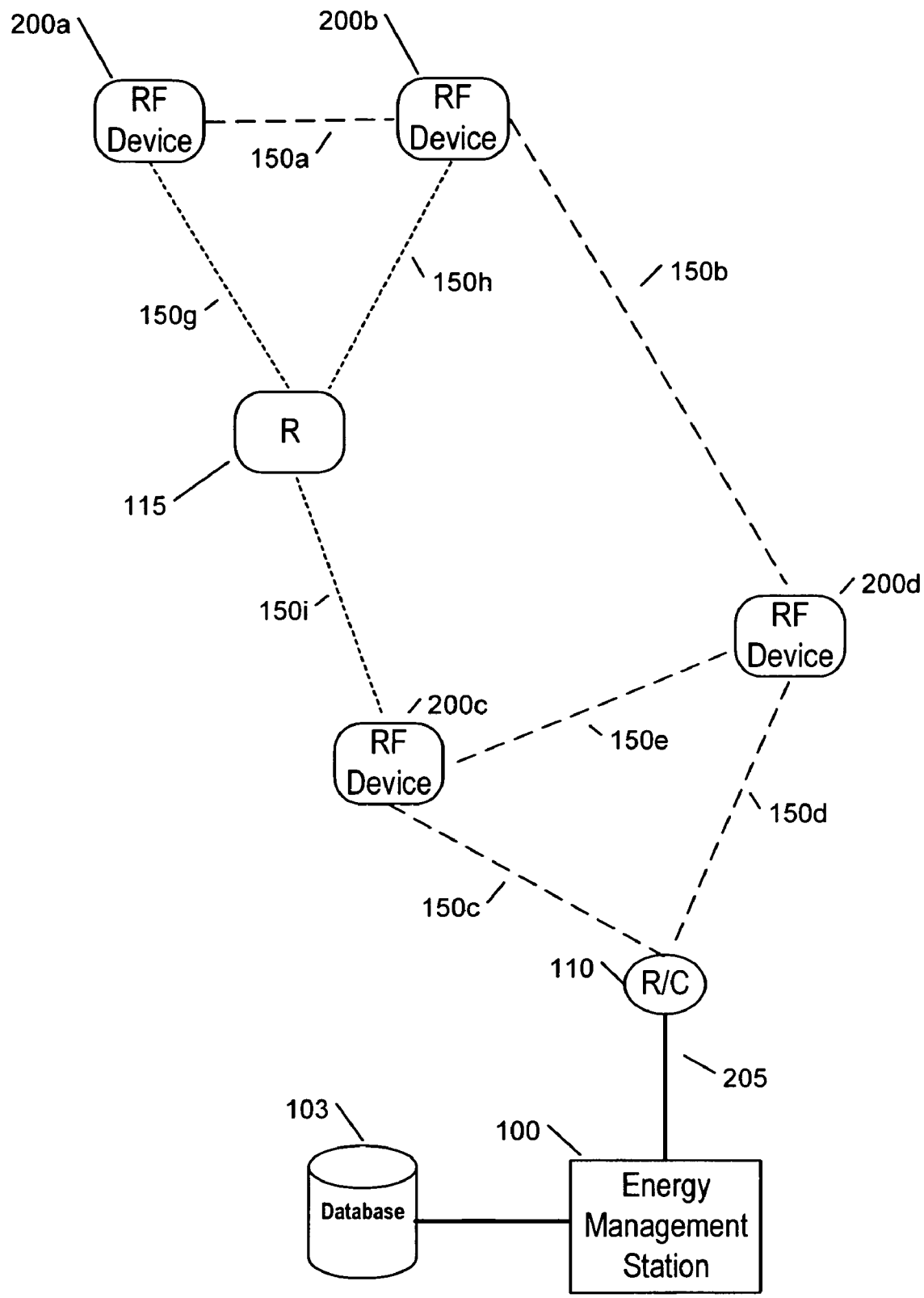
FIG. 3 depicts an embodiment of a communication diagram depicting mesh communication links.

If the communication verification device is unable to determine enough alternate paths exists for the mesh network reliability, it may indicate that an additional repeater 115 or RF device 200 should be installed. The communication verification function may be able to indicate the general or specific area that this repeater 115 should be installed. Alternately, the communication verification function may indicate which RF nodes need an alternate communication path. For instance, as shown in FIG. 3, a RF repeater 115 was added that created direct links to RF device 200a, RF device 200b and RF device 200c over wireless communication links 150g, 150h and 150i.

Figure 4:
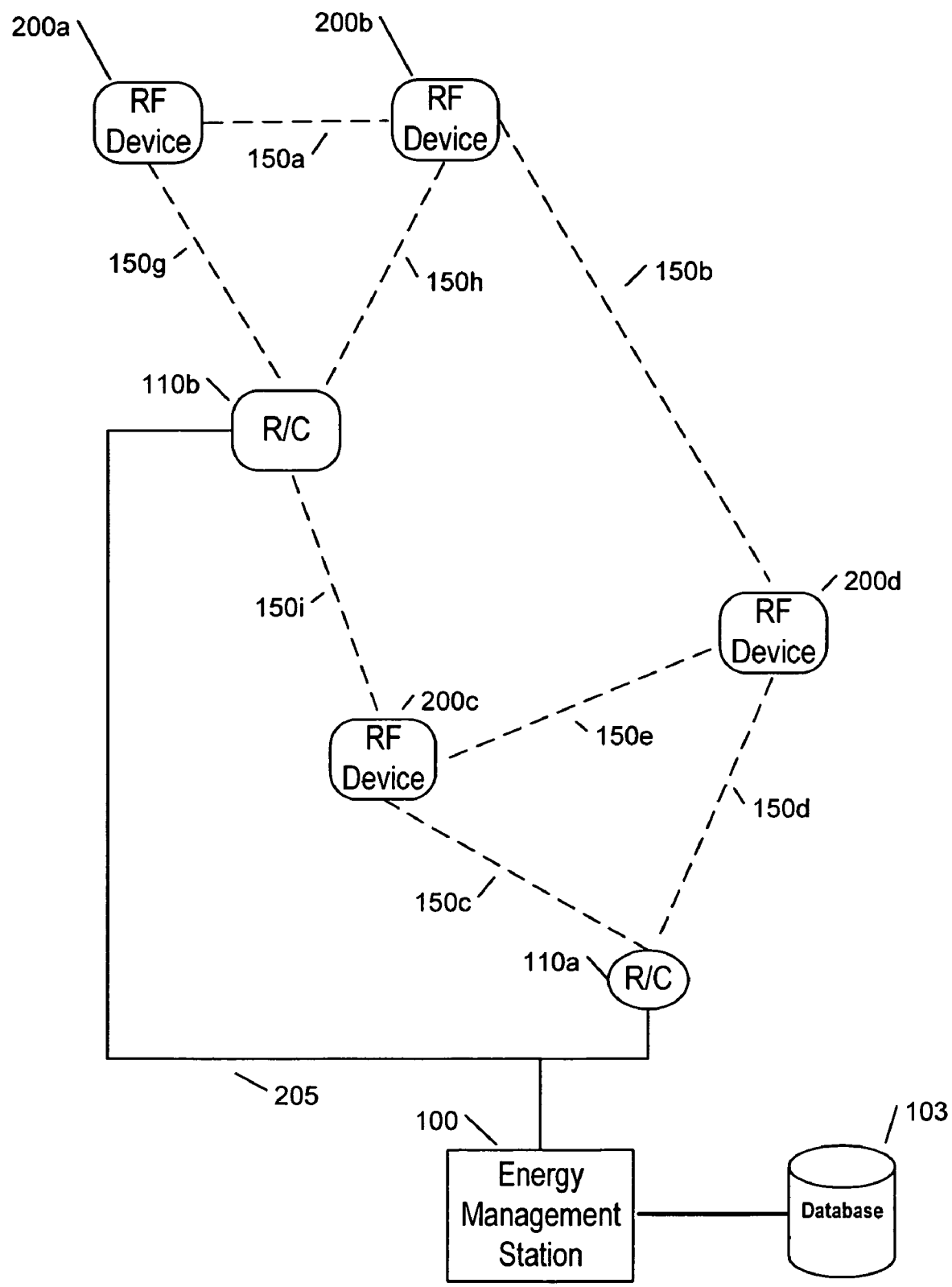
FIG. 4 depicts an embodiment of a communication diagram depicting mesh communication links.

Referring to FIG. 4, an embodiment of mesh network is shown with multiple repeater converters 110 to used to convert the mesh wireless signals to a media and protocol that is able to interface with the energy management station. The communication path 205 between the repeater converters 110a and 110b may be two independent communication connection from each repeater converters 110a and 110b to independent communication ports on the energy management station 100 such as but not limited to an RS 232 or USB connection. Alternately, these may share a signal communication interface such as but not limited to a wired or wireless Ethernet connection or RS-485 link. The repeater converter 110a may be sufficient to send and receive communication to the whole of the mesh network; however, repeater converter 110b may be added to increase reliability of the mesh network. This repeater converter 110b may function as a mesh repeater to hop signals from RF device 200a to RF device 200c and may function as an additional path for the RF mesh devices 200 to send and receive communication packets 1000 to the energy management station 100. This may reduce possibility of a network outage if repeater converter 110a is temporarily unavailable.

The repeater converters 110a and 110b in FIG. 4 may communicate to each other which RF devices 200 each are primarily responsible for communication. For instance, repeater converter 110b may primarily repeat communication packets 1000 between the energy management station 100 and RF devices 200a and 200b while repeater converter 110a may be the preferred mesh path for communication packets 1000 between the energy management station 100 and RF devices 200c and 200d. This organization between the repeater converters 110b may be a function of better quality data links to destination RF devices 200, lower number of hops to destination RF devices and load balancing of communication packets 1000 between the RF devices 200. In addition, the RF devices 200 and the repeater converters 110a and 110b may alter their RF transmission power such that messages are only received by RF devices 200 within a limited RF range. This may allow for more than one message to be simultaneously carried by the mesh network. For example, this may allow repeater converter 110a to communicate to RF device 200d at the same time repeater converter 110b is communication with RF device 200a.

The RF devices 200 may determine the next RF device 200 that is typically the successful wireless path of communication packets 1000 sent to a specific destination. The RF device 200 may send the next communication packet it receives that has the same specific destination to the specific RF device 200 on the first retransmission attempt such to reduce the number of RF collisions by other RF devices 200 receiving and retransmitting the communication packet. For example, in FIG. 3, a wireless communication packet 1000 sent from RF devices 200a with a target destination of the energy management station 110 may be able to be reached by both the RF device 200b and RF repeater 115 and potentially retransmitted from both. However, typically the quickest or most successful path for mesh communication from this RF device 200a includes the RF repeater 115 and not the RF device 200b. This may be determined by RF device 200a from a communication packet 1000 from the energy management station 100, RF device 200b or RF repeater 115 acknowledging the receipt of the information and the most successful wireless path used to deliver the communication packet 1000. Alternately the data integrity function in the energy management station 100 may determine the best wireless paths of the communication packet 1000 it received and if the that path was specified by the originating RF device 200a and any intermediate RF devices 200. If the path was not specified or incorrectly specified, the data integrity function may and for at least one specific destination and send out communication packets 1000 with instruction to specific RF devices 200 on the preferred path to use to retransmit data to that one specific destination to the RF devices 200. With this information, the next communication packet 1000 sent by RF device 200a may be specifically addressed to only be repeated by repeater 115 to the energy management station 100. Repeater 115 may interpret the communication packet 1000 is to be sent to the energy management station 100 and then using it's own determined best path to the energy management station 100, repeat the transmission and specifically address RF device 200c which would then repeat it specifically to repeater converter 110 which would convert the communication packet 1000 to interface to the communication link 205 and send the communication packet to the energy management station 100. The data integrity function within energy management station 100 may analyze the communication path taken by the packet, log the communication path taken, or instruct RF devices 200 within the mesh network of an alternate communication path this use with the next communication packet 1000 targeted to the same nodes.

The RF devices 200 and IED 135 may contain the data integrity function where the data integrity function includes routines to clean or self healing of the data. This may be referred to as a data validation engine ("DVE") and at least a portion may be contained with the energy management station 100. This data integrity function may include a self healing function where missing data is filled in or rebuilt from logged data within the original device or from other sensors. An example of this where energy data may be monitored at an incoming point at a certain energy junction as well as the outgoing points where one of the monitoring points data logs are missing data. The self healing function may recognize that energy metering flow into and out of this junction point nets zero meaning all energy supplied to this junction is accounting for by the outgoing energy meters. For example, in FIG. 1, the energy measured by IED 135 is distributed by the two feeders measured by energy sensors 120*b* and 120*c*. If data is missing from energy sensor 120*b*, the self healing function may be able to calculate the missing data from subtracting any data measured in energy sensor 120*b* from IED 135. Alternately, if the data is missing from both energy sensor 120*b* and 120*c*, the self healing function may be able to determine the average percentage of energy delivered via both feeders and divide the energy measured by IED 135. Alternatively, if the data is missing from IED 135 and the energy sensor 120*c*, the self healing function may be able to closely estimate the IED 135 from the measured data in energy sensor 120*b* and the percentage energy that energy sensor 120*b* typically monitors of the whole energy delivered by IED 135. This type of data healing may occur from any of the energy sensors 120 or IED 135 within the system with some logged or preset data of the relationships between the energy sensors 120 or the IED 135.

Figure 9:
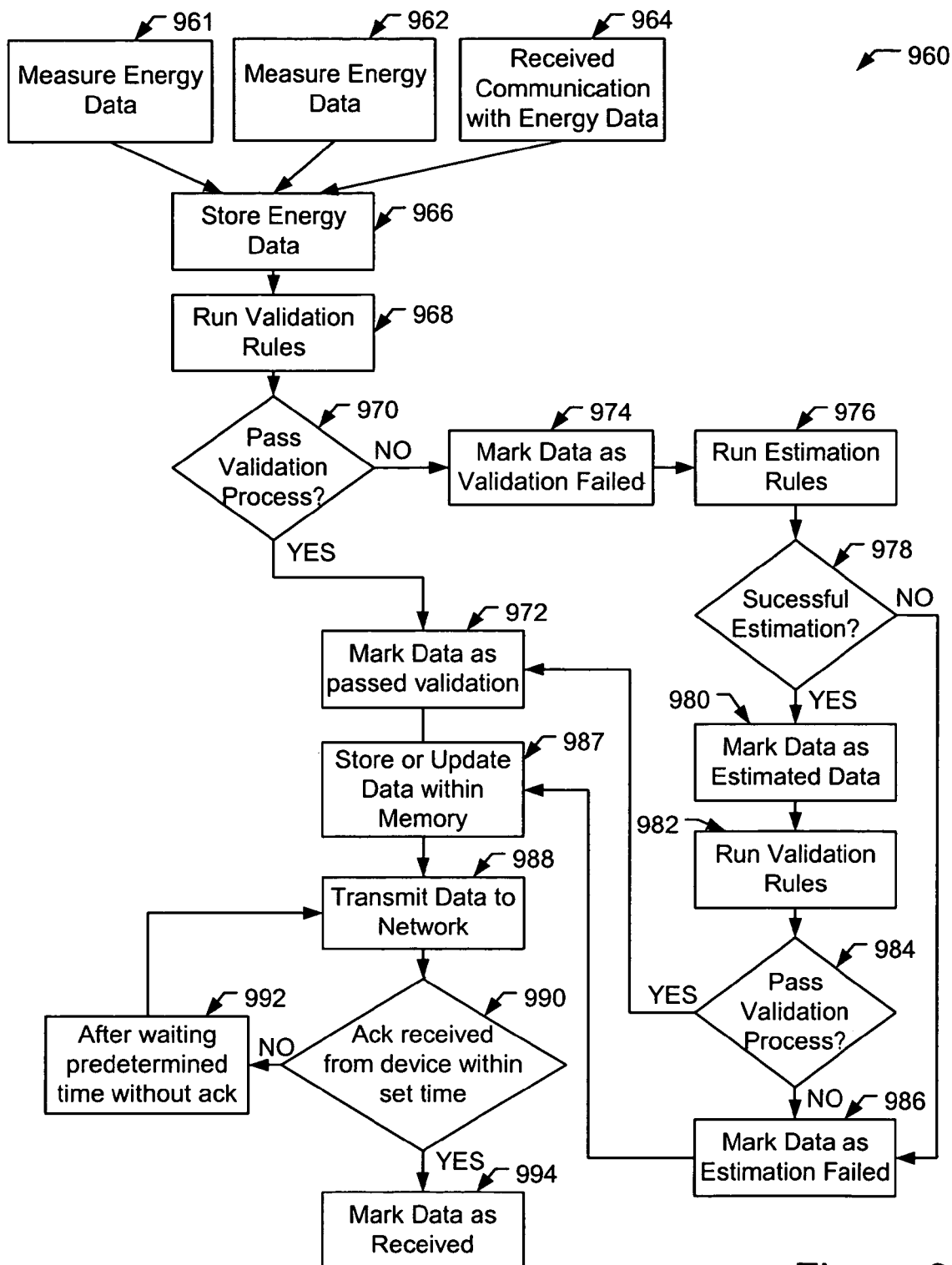

Referring now to FIG. 9, an exemplary flowchart is used to illustrate one embodiment for monitoring data quality within a RF device 200 or IED 135 used within an energy management system. This example depicts a data quality system that includes at least one of two methods of verifying the quality of the energy data measured by a sensor or receive over communication packet from another sensor. These two methods are a validation and estimation of the energy data and a communication acknowledgment system. The blocks or sections within the data quality system 960 may span over multiple devices. Alternately, some of the validation, estimation and editing ("VEE") functions or additional VEE functions may be performed in the energy management station 100. The data quality system 960 is processed on at least one of measured energy data (block 962) and energy data received over communication network (block 964). The energy data or communication packet 1000 received may be stored in memory (block 966) within the device such as but not limited to memory 855. Storing the energy data in block 966 may be optional portion of this process and in some cases the whole communication packet 1000 may alternatively be stored with a memory. Alternately the energy data may come from historical data records already stored with the memory as shown in block 961. The data quality process 960 may include a validation and estimation functions which may included one or more of the processes indicated by blocks 968, 970, 972, 974, 976, 978, 980, 982, 984, 986 and 987. The validation and estimation functions are described in the description the follows. If the validation and estimation functions are not included in the data quality process 960, the process moves from storing the energy data in block 966 to transmitting the data to the network in block 988. The data quality system 960 may include a communication acknowledgement system shown in block 990, 992 and 994 discuss in the description to follow. If the data integrity system does not include the communication acknowledgment system, it may be complete at block 988.

The communication acknowledgement system may wait for an acknowledgment to be received from another RF device 200 used to further transmit the communication packet 1000 to a designated endpoint or from the endpoint itself once it has received the communication packet 1000 either directly or through other RF devices 200. This waiting for acknowledgment is shown in block 990. If the acknowledgment is not received within a set amount of time as shown in block 992, the communication packet may be retransmitted to the network in block 998. The RF device 200 may change the communication packet 1000 before retransmitting to the network to affect routing within the network. Alternatively, the RF device 200 may use another method of communication if available. An example, the alternate method of communication may be but not limited to a backup method of communication using an interface over a plain old telephone system ("POTS") line, a paging network, cellular network, alternate radio frequency or modulation, or a satellite connection. Using this communication validation system, once an acknowledgment is received, the data that may still be stored with the memory of the RF device 200 or IED 135 is marked as received by the endpoint or a subsequent RF device 200 within a wireless communication network.

The RF devices 200 and IED 135 data integrity function may include a validation function, estimation function and editing function. Any individual function or combination of these three functions may reside within a validation, estimation, editing ("VEE") function. This VEE function may exist in any of the energy sensors 120, repeaters 115, and repeater converters 110 within the mesh network. The VEE function may comprise of one or more VEE rules. These VEE rules may comprise any number of validation rules, estimation rules and editing rules. Placing VEE functions and VEE rules into the IED 135 or RF devices 200 directly may reduce the processing burden on the energy management station 100. In addition, any users that use an energy management station 100 that does not include a VEE module may still benefit when the actual measurement devices, such as the EED 135 or RF device 200, or communication devices, such as the RF repeater 115, RF repeater converter 110, or any hardware used to receive and transmit communication packets, contain VEE functionality at the device level. The VEE function may be able to process a measurement or logged measurement made by an energy sensor 120 or EED 135 to ensure that reading complies with any preset VEE rules.

FIG. 9 indicates one embodiment of this validation and estimation process within blocks 968, 970, 972, 974, 976, 978, 980, 982, 984, 986 and 987. As energy data enter this process at block 968 from either blocks 961, 962 or 964 (may pass through block 966) a validation process is run against the data using one or more validation rules. If the data passes the validation process at block 970, the data is marked as validated meaning it has passed validation at block 972 and is transmitted to the network at block 988. If the data did not pass the validation process at block 970, it may be marked as failing validation at block 974 and may have estimation process and rules run on the energy data at 976. This estimation process may use data from other RF devices 200, IED 135, or historical energy data intervals. At block 978, if unable to calculate an estimation value using available estimation rules, the data is marked with an estimation failed indication (block 986) as may stored within the memory (block 987) for further editing or to run through this estimation process once new data is received or measured. If at block 978, the estimation process is successful, the data may be marked as estimated (block 980) and may have a validation process (block 986) run against the newly estimated value. This validation process (block 986) may use different validation rules from the validation process at block 968. If the validation process is successful (block 984), the data may be marked as passing validation; however, the data may retain the estimation indication from block 980. The data or data record may then be stored or updated in the memory of the device at block 987. If the second validation process was unsuccessful (block 984), the data may be marked as estimation failed and may be stored within the memory (block 987) for further editing or to run through the estimation process once new data is received or measured. The data may be transmitted on to the network at block 988 and carry through the process as already described.

For example, a validation rules may include but are not limited to the following examples. For example, a validation rule may check that the measured energy used over an specific interval does not exceed a maximum, check to ensure the energy readings did not increase by more than a set amount, and check another energy meters readings to verify both energy meters are within a preset percentage of each other. Another example of a validation rule may comprise of summing up all interval data during a billing period and comparing this summation to the difference between the cumulative energy reading at the end of the billing period and the one at the start of this billing period. These two numbers should be nearly equal or within a preset percentage. A typical VEE rule may compare those two numbers and accept them if they are within x % of each other.

Another validation rule example may compare any given interval data reading to the one before, and reject it if there is more than x % difference between them. Alternatively, the validation rule may compare each interval data reading to the same interval timeframe for the previous business day, month, year etc. For example, the kWh reading on Thursday from 10:15 to 10:30 should be within y % of the kWh reading on Wednesday from 10:15 to 10:30.

Another validation rule example may compare each interval data between a main meter and a backup or secondary meter. Typically all revenue metering points are nearby such that a wired or wireless communication would be possible. Again, these reading may be validated if they are within x % of each other. Typically x % may be a function of the meter's accuracy such that, for example, if both meters are class 0.2 meters, the difference between their readings should be less than 0.4%. Of course, it may be set to any value.

Another validation rule may be where the meter, RF device 200 or IED 135 may proactively recognize when specific events happen (error codes, power cycles . . . ) and flag the relevant intervals as requiring an estimation rule or editing rule. Alternatively, in the case that a measurement does not pass with a specific validation rule, the VEE function may flag the relevant interval to require an estimation rule or editing rule. This flag indication may be stored along side the measurement value or within the same set of data within the log memory 855. This indication flag may be resilient or be made to be resilient so that the flag may remain with this set of data for the life of the data.

The estimation function may estimate the value based on previously logged measurement data, data from other sensors or alternatively mark the data unclean and wait for additional measurements. The VEE function may then use these new measurements and may use previous recorded measurements to estimate the data and replace the data. The VEE function may request data from other meters to assist the validation and estimation process. The new estimated value may have to pass the validation function before it is recorded in the memory log as valid data. An estimated value may be generated when the data being tested does not pass the validation function within the IED 135 or RF device 200, the data is missing, the data is corrupt or otherwise unavailable.

Estimation rules that may be applied within the IED 135 or RF device 200 may include but are not limited to the following example. One example is an estimation rule that may replace bad or missing interval data with readings for the same intervals coming from the backup meter. This information may be transferred over a wired link, power line carrier, or a wireless communication link such as but not limited to IEEE 802.11a, IEEE 802.11b, IEEE 802.11g, IEEE 802.11s optical link, or a wireless mesh network. When only one interval is missing or flagged as bad, an estimation rule may use the difference between cumulative energy reading at billing period end and cumulative energy reading at billing period start minus summation of all good interval data. For example, the billing period may begin at the start of the day and end at the completion of the day. The estimation may be calculate by the difference of the cumulative energy recorded at the beginning of the day and the cumulative energy reading at the end of the day minus the summation of all the energy demand intervals throughout the day. Another example of an estimation rule is using the average interval consumption for this site or using the same interval the day before.

The editing function may interface with a user interface, such as a display and keypad, on the IED 135 or RF device 200 and allow an operator to edit a recorded data value. The editing function may further comprise an editing rule that only allows data that was unable to pass the validation or estimation functions to be edited. Any data that has been edited may be marked with a flag to so indicate it has been edited. In addition, it may be marked by who the edit took place. The edit indication flag may be resilient or be made to be resilient such that the flag stays with the data for the life of the data. Another example of an editing rule may comprise a security process to ensure the operator attempting to change the value is authorized to edit a data value. The security process and authorization may be unique for different recorded values. For example, a recorded value such as an energy reading that may affect a bill may require different authorization than editing a voltage value. The editing process may involve the user using another device such as a handheld device 635 which comprises an user interface and is operative to communicate to the IED 135 or RF device 200 to edit a data value. Alternately, the energy management station 100 may be used to provide the user interface to allow the data value to be edited. This energy management station 100 may allow this edit process to be run locally at the energy management station 100. Alternatively, the energy management station 100 may allow the edit to take place on the EED 135 or RF device 200 providing a user interface to the device via a communication link.

As part of the VEE function, the following interval data flags may be used. Raw data flag or no flag may indicate the data has not been through any VEE function. Any edited or estimated data may contain an edited/estimated flag. For Edited data, a trace also may be kept of the person who edited this data based on the authorization process or a user ID. Any data that has passed validation process may be marked with a validation passed flag. Any data that has failed a validation process may be marked with a validation failed flag. A verified data flag may indicate that data has failed at least one of the required validation checks but was determined to represent actual usage by either another validation flag or through an editing process. Typically a set of data may have some of its flags change as it progresses through the validation process; however, there may be 1 exception that is when the estimated or edited indication flag is set, it is resilient and remains with the specific set of data for the life of this set of data. For example, the meter accumulates a load profile for 24 hours, but the 9:00 to 9:15 interval is missing for whatever reason. The first validation attempts failed because of this missing interval, and the whole set of data is being marked as having failed validation. Then the meter estimates and creates this interval through one of the mechanisms described earlier, and flags this interval as having been estimated. Then, the whole set of data goes through validation again, and, this time, passes. At this point, the entire set of data gets marked as having passed validation, but the interval that was estimated remains marked as such forever, even though it is now part of a set of validated data.

The VEE function within the specific IED 135, energy sensor 120 or other RF devices 200 may be able to request another measurement is taken by the original measurement device or another IED 135 or RF device 200 to assist in the validation and estimation process. Having the IED 135 or energy sensor 120 make this request rather than a VEE function on the energy management station 100 may decrease time required to take an unscheduled measurement to assist in the VEE function.

Whenever data is rebuilt from other data using the self healing function, VEE function, or other calculations, a confidence value or indicator may be generated to be stored with the data. This confidence value may indicate the level of confidence or cleanliness of the data. The confidence value may be contain a statistical probability indication of the data used within the log especially if the data was calculated using averages from the data log. In addition, the confidence value may indicate the accuracy of the sensor used to measure, calculate, or generate the energy data value. The data integrity function either within the energy management station 100, the RF devices 200 or the IED 135 may alarm if the confidence level is outside of a preset tolerance or has significantly altered from historical levels.

It is therefore intended that the foregoing detailed description be regarded as illustrative rather than limiting, and that it be understood that it is the following claims, including all equivalents, that are intended to define the spirit and scope of this invention.

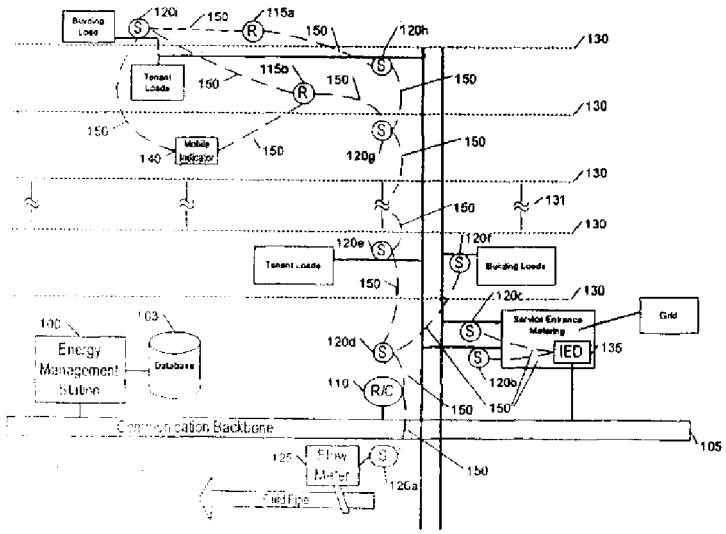

What is claimed is:

1. A system for monitoring energy data, the energy data representative of the energy from at least a point of an energy distribution system, the system comprising:
    a wireless mesh network that provides multiple links including wireless links to an energy management station;
    a first radio frequency ("RF") device operative to monitor energy at least at one point of the energy distribution system, construct energy data representative of at least a portion of the monitored energy, construct a communication packet containing the energy data, and transmit the communication packet on the wireless mesh network;
    a second RF device coupled to the first RF device over the wireless mesh network with a wireless link, the second RF device operative to receive the communication packet and retransmit the communication packet over the wireless mesh network wherein the wireless link between the first RF device and the second RF device comprises a data link; and,
    a data integrity function, including validation and estimation of the energy data, coupled with at least one of the first and second RF devices, and operative to monitor data integrity of the energy data, wherein the energy management station receives the energy data transmitted by the first RF device.

2. The system of claim 1, wherein the second RF device is further operative to monitor energy at a point within the energy distribution system.

3. The system of claim 1, wherein the communication packet comprises a first communication packet, the data integrity function further operative to alter at least one aspect of the communication network and alter the transmission of a second communication packet over the wireless mesh network.

4. A system of claim 1, wherein the second RF device is at least one of a repeater and a repeater converter.

5. The system of claim 1, wherein the data integrity function comprises a communication validation function and wherein the communication validation function is operative to determine an approximate distance of the data link between the first RF device and the second RF device.

6. The system of claim 1, wherein the data integrity function comprises a communication validation function and wherein the communication validation function is operative to produce a report on the data link reliability within the wireless mesh network.

7. The system of claim 6, wherein the report on the data link reliability comprises a number of nines indication of historical success of wireless communication for the data link.

8. The system of claim 6, wherein the report on the data link reliability comprises at least one of the following an alarm, an indication and a third communication packet.

9. The system of claim 1, wherein the second RF device is further operative to receive the communication packet from the first RF device, at least partially alter the communication packet, and retransmit the altered communication packet.

10. The system of claim 1, wherein the data integrity function is a first data integrity function and the communication packet is a first communication packet; the system further comprising:
    an energy management station operative to transmit a second communication packet;
    a receiver converter device coupled with the energy management station and the wireless mesh network, the receiver converter operative to receive and transmit the first and second communication packet from the wireless mesh network and the energy management station; and
    a second data integrity function coupled to the energy management station.

11. The system of claim 10, wherein one of the first data integrity function and second data integrity function comprises a communication validation function.

12. The system of claim 11, wherein the communication validation function is operative to detect if the first communication packet is gone past a preset threshold from one of the first RF device and second RF device.

13. The system of claim 12, wherein the communication validation function is further operative to initiate an alarm if an expected communication has not been received.

14. The system of claim 10, wherein at least one of the first data integrity function and second data integrity function is operative to determine the data link used by the mesh network to transmit the communication packet from the first RF device to the data integrity function.

15. The system of claim 14, wherein at least one of the first data integrity function and second data integrity function is operative to determine a critical path used by at least one of the first and second communication packets transmitted by the first RF device.

16. The system of claim 14, wherein at least one of the first data integrity function and second data integrity function is operative to indicate possible communication paths from energy sensor to the at least one of the first data integrity function and second data integrity function.

17. The system of claim 10, wherein the data link is a first data link, the system further comprising:
a third radio frequency ("RF") device operative to receive the first communication packet from the wireless mesh network and retransmit the first communication packet on the wireless mesh network wherein a second data link is comprised between the second RF device and the third RF device and a third data link is comprised between the third RF device and the repeater converter;
wherein at least one of the first data integrity function and second data integrity function is operative to transmit a third communication packet to the third RF device to temporarily block communication links incorporating the third RF device.

18. The system of claim 17, wherein first data integrity function is operative to initiate an alarm where communication is restricted between the first data integrity function and at least one of the energy management station.

19. The system of claim 17, wherein second data integrity function is operative to initiate an alarm where communication is restricted between the second data integrity function and at least one of the first RF device and second RF device.

20. The system of claim 1, wherein the data link is a first data link and the system further comprising:
a third RF device operative to receive and retransmit the first communication packet from the wireless mesh network wherein at least a second data link is possible between the first and second RF device;
wherein the data integrity function is operative to identify a preferred data link from the first and second data link.

21. The system of claim 20, where the preferred data link is identified based on at least one of a signal to noise ratio, signal strength, data link reliability, latency, number of data links and physical location.

22. The system of claim 20, wherein the data integrity function is operative to transmit a third communication packet to the first RF device instructing the first RF device to use the second RF device as an intermediate step to transmit the second communication packet to the data integrity function.

23. The system of claim 1, wherein the second RF device further comprising a log memory wherein the data integrity function is further operative to store the first and second communication packets from the wireless mesh network within the log memory.

24. The system of claim 1, wherein the first RF device further comprising a log memory used to store the energy data wherein the data integrity function further operative to remove intermediate data from the log memory as the log memory reaches a predetermined threshold and the energy data stored in the log is waiting for acknowledgment of successful transmission.

25. The system of claim 1, wherein the second RF device further comprises a log memory wherein the data integrity function further operative to remove and store the energy data from the first and second communication packets from the wireless mesh network within the log memory.

26. The system of claim 25, where the data integrity function is further operative to transmit a third communication packet containing the stored energy data.

27. The system of claim 25, where the data integrity function within the RF device operative to transmit acknowledgment to the energy sensor that at least one of the first communication packet and second communication packet is received and stored within the memory of the RF device.

28. The system of claim 25, wherein the data integrity function further operative to remove intermediate data from the log memory as the log memory reaches a predetermined threshold and the energy data stored in the log is waiting for acknowledgment of successful transmission.

29. The system of claim 25, wherein the log memory comprises digital bits operative to store information data; and wherein the data integrity function operative to reduce the number of digital bits used to store the energy data within the log memory as the log memory reaches capacity and the energy data stored in the log is waiting for acknowledgment of successful transmission.

30. The system of claim 1, where the data integrity function comprises at least one validation rule and is further operative to validate energy data using the at least one validation rule.

31. The system of claim 30, where the energy data analyzed by the data validation function is stored within the log memory.

32. The system of claim 31, wherein the data integrity function is coupled with the first RF device and the data integrity function is operative to use the energy data from the second RF device when applying the data validation rule.

33. The system of claim 30, where the data integrity function further comprising at least one data estimation rule and is further operative to calculate an estimation of the energy data using the data estimation rule.

34. The system of claim 33, wherein the data integrity function is coupled with the first RF device and the data integrity function is operative to use the energy data from the second RF device when applying the estimation rule.

35. The system of claim 30, wherein at least one of the first RF device and second RF device further comprises a user interface, wherein the user interface operative display the log memory and allow the log memory to operate an edit process, further the data integrity function operative to indicate in the log memory where the energy data has been edited.

36. A system for controlling data quality within an energy distribution system, the system comprising:
a mesh network including a plurality of wireless links, the mesh network having a first RF device and a second RF device, wherein the first RF device and the second RF device are able to communicate over the mesh network using some of the plurality of wireless links;

a communication validation function coupled to the first RF device and the second RF device, the communication validation function providing a measurement of robustness or redundancy of the plurality of wireless links and operative to monitor the plurality of wireless links in order to facilitate the transmission of energy data on the mesh network by adjusting at least one of the first RF device, the second RF device, and the plurality of wireless links based on the measurement.

37. A system as defined in claim 36, wherein the communication validation function identifies a probability of success for the plurality of wireless links.

38. A system as defined in claim 37, wherein the communication validation function identifies at least one location for a repeater to improve the probability of success.

39. A system as defined in claim 36, wherein the communication validation function identifies specific wireless links having a link quality that is below a preset threshold.

40. A system as defined in claim 36, wherein the communication validation function tracks a path of at least one communication packet transmitted between the first RF device and the second RF device in the mesh network using route information bits.

41. A system as defined in claim 36, wherein the communication validation function verifies specific wireless links that enable energy data to be transmitted from the first RF device to an energy management station.

42. A system as defined in claim 36, wherein the communication validation function temporarily disables one or more wireless links to determine if the mesh network generates a backup path from the plurality of wireless links.

43. A system as defined in claim 42, wherein the communication validation function includes a command sent to at least the first RF device to stop retransmitting communication packets on the one or more wireless links.

44. A system as defined in claim 36, wherein the communication validation function identifies a particular number of distinct communication paths from the first RF device to an energy management station from the plurality of wireless links.

45. A method for monitoring energy data, the energy data representative of the energy from at least a point of an energy distribution system, the method comprising:

monitoring energy at least at one point of the energy distribution system with a first radio frequency ("RF") device;

constructing energy data representative of at least a portion of the monitored energy;

transmitting the energy data in a communication packet on a wireless mesh network that includes a plurality of wireless links;

receiving the communication packet from the wireless mesh network with the second RF device;

retransmitting the communication packet from the second RF device; and, monitoring the data integrity of at least one of the wireless communication network and the energy data with a data integrity function coupled with at least one of the first and second RF devices, the data integrity function including validation and estimation of the energy data; and displaying the energy data on a display.

46. The method of claim 45, wherein constructing energy data representative of at least a portion of the monitored energy further comprises analyzing the energy data with a data integrity function.

47. The method of claim 46 wherein analyzing further comprises marking the energy data at least one of the following: passed and failed.

48. The method of claim 46 wherein analyzing further comprises:

marking the energy data as failed; and estimating new energy data.

49. The method of claim 45, wherein transmitting the energy data in a communication packet on the wireless mesh network further comprises waiting on a transmission acknowledgement from the second RF device.

* * * * *

UNITED STATES PATENT AND TRADEMARK OFFICE
CERTIFICATE OF CORRECTION

| | | |
|---|---|---|
| PATENT NO. | : 7,251,570 B2 | Page 1 of 4 |
| APPLICATION NO. | : 11/122380 | |
| DATED | : July 31, 2007 | |
| INVENTOR(S) | : Hancock et al. | |

It is certified that error appears in the above-identified patent and that said Letters Patent is hereby corrected as shown below:

The title page, showing an illustrative figure, should be deleted and substitute therefor the attached title page.

Drawings
Sheet 5, replace "Figure 5" with the Figure depicted herein below, wherein "I2h" and "V2h" have been corrected.

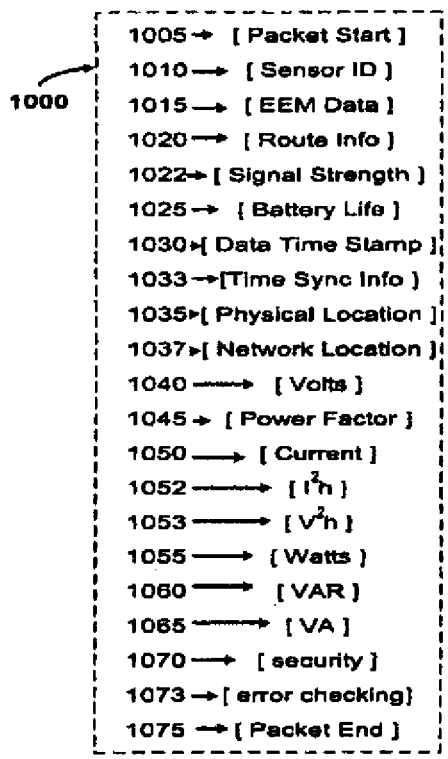

Figure 5

Column 4
Line 25, after "refer", insert --to--

Column 5
Line 35, before "RF", change "a" to --an--

UNITED STATES PATENT AND TRADEMARK OFFICE
CERTIFICATE OF CORRECTION

PATENT NO. : 7,251,570 B2
APPLICATION NO. : 11/122380
DATED : July 31, 2007
INVENTOR(S) : Hancock et al.

It is certified that error appears in the above-identified patent and that said Letters Patent is hereby corrected as shown below:

Column 6
Line 22, change "it's" to --its--

Column 7
Line 25, before "but", insert --,--
Lines 42-43, change "communication" to --communicate--
Line 57, before "RF" change "a" to --an--

Column 10
Line 21, change "for example" to --such as--

Column 14
Line 22, after "Alternatively", insert --,--
Line 23, before "RF", change "a" to --an--

Column 15
Line 38, change "embodiments'" to --embodiment's--
Line 67, after "typically", insert --,--

Column 17
Line 28, change "uses" to --use--
Line 40, after "Alternatively", insert --,--

Column 19
Line 13, after "report", insert --s--

Column 20
Line 60, change "in addition" to --, in addition,--
Line 61, before "directly", insert --be--

Column 22
Line 31, after "interval", change "was" to --were--

Column 23
Line 7, remove [900]
Line 20, remove [900]

UNITED STATES PATENT AND TRADEMARK OFFICE
CERTIFICATE OF CORRECTION

PATENT NO. : 7,251,570 B2
APPLICATION NO. : 11/122380
DATED : July 31, 2007
INVENTOR(S) : Hancock et al.

It is certified that error appears in the above-identified patent and that said Letters Patent is hereby corrected as shown below:

Column 25
Line 24, change "etc" to --etc.--

Column 26
Line 3, after "information", insert --1033--
Line 5, change "I2R" to --I2h--

Column 32
Line 13, change "998" to --988--
Lines 18-19, change "but not limited to" to --, but not limited to,--

Column 33
Line 34, change "x %" to --x%--
Line 38, change "x %" to --x%--
Line 42, change "y %" to --y%--
Line 48-49, change "x %" to --x%--
Line 49, change "x %" to --x%--

Column 34
Line 61, change "EED" to --IED--

Signed and Sealed this

Seventeenth Day of November, 2009

David J. Kappos
*Director of the United States Patent and Trademark Office*

(12) United States Patent
Hancock et al.

(10) Patent No.: US 7,251,570 B2
(45) Date of Patent: Jul. 31, 2007

(54) DATA INTEGRITY IN A MESH NETWORK

(75) Inventors: Martin A. Hancock, Victoria (CA);
Arthur B. Wynans, Victoria (CA);
Bernard C. Mansey, Malahat (CA);
Darrin G. Marr, Victoria (CA); Simon H. Lightbody, Victoria (CA); Michael E. Teachman, Victoria (CA); Scott M. Henneberry, Franklin, TN (US)

(73) Assignee: Power Measurement Ltd., Saanichton (CA)

(*) Notice: Subject to any disclaimer, the term of this patent is extended or adjusted under 35 U.S.C. 154(b) by 10 days.

(21) Appl. No.: 11/122,380

(22) Filed: May 4, 2005

(65) Prior Publication Data

US 2006/0056370 A1 Mar. 16, 2006

Related U.S. Application Data

(63) Continuation-in-part of application No. 11/083,909, filed on Mar. 18, 2005, and a continuation-in-part of application No. 10/892,837, filed on Jul. 16, 2004, now Pat. No. 7,089,089.

(60) Provisional application No. 60/488,700, filed on Jul. 18, 2003, provisional application No. 60/554,188, filed on Mar. 18, 2004.

(51) Int. Cl.
*G01R 15/00* (2006.01)
*G06F 19/00* (2006.01)

(52) U.S. Cl. .................... 702/57; 709/224

(58) Field of Classification Search ......... 702/44–45, 702/57, 60–63; 700/286, 291; 709/223–227, 709/230, 238
See application file for complete search history.

(56) References Cited

U.S. PATENT DOCUMENTS

| | | | |
|---|---|---|---|
| 3,534,247 A | 10/1970 | Miljanic | 323/357 |
| 4,841,236 A | 6/1989 | Miljanic et al. | 324/127 |
| 5,719,723 A * | 1/1998 | Hoth et al. | 702/181 |
| 5,854,994 A * | 12/1998 | Canada et al. | 702/56 |
| 5,874,903 A | 2/1999 | Shuey et al. | 340/870.02 |
| 6,018,700 A | 1/2000 | Edel | 702/60 |
| 6,052,364 A * | 4/2000 | Chalmers et al. | 370/312 |
| 6,115,653 A * | 9/2000 | Bergstrom et al. | 701/29 |

(Continued)

FOREIGN PATENT DOCUMENTS

WO WO 02/039242 5/2002

(Continued)

*Primary Examiner*—Marc S. Hoff
*Assistant Examiner*—Mary Catherine Baran
(74) *Attorney, Agent, or Firm*—Workman Nydegger

(57) ABSTRACT

Systems and methods for ensuring data integrity in a mesh network. A mesh network can include multiple RF devices. Transmitting quality data in or on the mesh network is improved using communication validation functions. The communication validation functions ensure a reliable communication network, preserve data during a network outage, and validate data. The communication validation functions can measure or control data quality within a communication and analysis network. The communication validation function operates to control data quality, for example, by measuring the quality of wireless links, ensuring the presence of redundant links, testing the ability of the mesh network to establish a backup communication path, generating alarms based on communication thresholds, tracking the communication path followed by communication packets, and identifying placement locations for additional RF devices.

49 Claims, 9 Drawing Sheets